(12) United States Patent
Ohno et al.

(10) Patent No.: US 9,745,012 B2
(45) Date of Patent: Aug. 29, 2017

(54) VEHICLE

(71) Applicant: YAMAHA HATSUDOKI KABUSHIKI KAISHA, Iwata-shi, Shizuoka (JP)

(72) Inventors: Kohsuke Ohno, Shizuoka (JP); Hiroyuki Yoshikuni, Shizuoka (JP); Nobuhiko Hirakawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/279,745

(22) Filed: Sep. 29, 2016

(65) Prior Publication Data

US 2017/0088214 A1 Mar. 30, 2017

(30) Foreign Application Priority Data

Sep. 30, 2015 (JP) ................................. 2015-194215

(51) Int. Cl.
| | |
|---|---|
| *B62K 5/08* | (2006.01) |
| *B62D 7/16* | (2006.01) |
| *B62K 5/05* | (2013.01) |
| *B62K 5/10* | (2013.01) |
| *B62K 5/027* | (2013.01) |
| *B62K 21/18* | (2006.01) |

(52) U.S. Cl.
CPC ................. *B62K 5/08* (2013.01); *B62D 7/16* (2013.01); *B62K 5/027* (2013.01); *B62K 5/05* (2013.01); *B62K 5/10* (2013.01); *B62K 21/18* (2013.01)

(58) Field of Classification Search
CPC combination set(s) only.
See application file for complete search history.

(56) References Cited

U.S. PATENT DOCUMENTS

| | | | |
|---|---|---|---|
| 2005/0167174 A1* | 8/2005 | Marcacci | B60G 17/0152 180/76 |
| 2006/0097471 A1* | 5/2006 | Van Den Brink | B62J 25/00 280/124.103 |

(Continued)

FOREIGN PATENT DOCUMENTS

| | | |
|---|---|---|
| CN | 1749092 A | 3/2006 |
| DE | 20 2009 017 382 U1 | 5/2010 |

(Continued)

OTHER PUBLICATIONS

Official Communication issued in corresponding European Patent Application No. 16191760.4, dated Jun. 21, 2017.

*Primary Examiner* — Nicole Verley
(74) *Attorney, Agent, or Firm* — Keating and Bennett, LLP

(57) ABSTRACT

A vehicle includes a linkage, a steering force transmission, and a steering lock. The steering force transmission includes a rear shaft that is able to turn about a rear axis, a front shaft that is able to turn about a front axis, and a connector. When seen from a side of the vehicle, a distance between the front shaft and a right steering axis is smaller than a distance between the rear shaft and the right steering axis, and in which at least one portion of the steering lock that is mounted on the front shaft or a member that turns together with the front shaft and a member that is displaced relative thereto is provided in a position that overlaps a movable range of the linkage when seen from the side of the vehicle.

17 Claims, 16 Drawing Sheets

(56) References Cited

U.S. PATENT DOCUMENTS

| | | | |
|---|---|---|---|
| 2006/0151232 A1* | 7/2006 | Marcacci | B60G 21/007 |
| | | | 180/414 |
| 2014/0284899 A1 | 9/2014 | Takenaka et al. | |
| 2014/0375015 A1* | 12/2014 | Yu | B62K 5/027 |
| | | | 280/267 |
| 2015/0246704 A1* | 9/2015 | Takano | B60G 17/005 |
| | | | 280/269 |
| 2016/0137251 A1* | 5/2016 | Mercier | B62K 5/05 |
| | | | 180/210 |
| 2016/0264214 A1* | 9/2016 | Rasmussen | B62K 5/05 |
| 2016/0280193 A1* | 9/2016 | Seto | B60T 8/1706 |
| 2017/0088219 A1* | 3/2017 | Yoshikuni | B60G 13/003 |
| 2017/0101150 A1* | 4/2017 | Shibuya | B62J 99/00 |

FOREIGN PATENT DOCUMENTS

| | | |
|---|---|---|
| JP | 59-020782 A | 2/1984 |
| JP | 2000-001188 A | 1/2000 |
| JP | 2012-206585 A | 10/2012 |
| WO | 2014/046282 A1 | 3/2014 |

\* cited by examiner

VEHICLE

BACKGROUND OF THE INVENTION

1. Field of the Invention

The present invention relates to a vehicle including a body frame that is able to lean and two front wheels that are aligned side by side in a left-and-right direction.

2. Description of the Related Art

International Patent Publication No. 2014/046282 describes a vehicle including a body frame that is able to lean and two wheels that are aligned in a left-and-right direction. This vehicle includes a linkage. The linkage includes an upper cross member and a lower cross member. In addition, the linkage also includes a right side member that is connected to right portions of the upper cross member and the lower cross member, and a left side member that is connected to left portions of the upper cross member and the lower cross member. Middle portions of the upper cross member and the lower cross member are supported on the body frame. The upper cross member and the lower cross member are supported on the body frame so as to turn about axes that extend substantially in a front-and-rear direction of the body frame.

The upper cross member and the lower cross member turn relative to the body frame as the body frame leans, such that a relative position between the two front wheels in an up-and-down direction of the body frame changes. The upper cross member and the lower cross member are provided above the two front wheels in the up-and-down direction of the body frame in such a state that the vehicle is standing upright.

This linkage supports the right front wheel and the left front wheel so as to move in the up-and-down direction of the body frame. The linkage supports the right front wheel so as to turn about a right steering axis that extends in the up-and-down direction of the body frame and supports the left front wheel so as to turn about a left steering axis that is parallel to the right steering axis.

This vehicle includes a handlebar, a steering shaft and a tie-rod. The handlebar is fixed to the steering shaft. The steering shaft is supported so as to turn relative to the body frame. When the handlebar is turned, the steering shaft is also turned. The tie-rod transmits the turning motion of the steering shaft to the right front wheel and the left front wheel to turn the right front wheel about the right steering axis and turn the left front wheel about the left steering axis.

In the vehicle described in International Patent Publication No. 2014/046282, the handlebar turns about an axis that extends in the up-and-down direction of the body frame, and the upper cross member and the lower cross member of the linkage turn about the axes that extend in the front-and-rear direction of the body frame. Due to this, the handlebar is disposed above the linkage so as to avoid interference with the linkage.

When attempting to develop a vehicle having a larger engine displacement than that of the vehicle described in International Patent Publication No. 2014/046282, greater rigidity is required of the linkage, and this enlarges the linkage in size, such that the handlebar position is eventually raised. Alternatively, when attempting to develop a vehicle having a larger maximum banking angle than that of the vehicle described International Patent Publication No. 2014/046282, the movable range of the linkage is enlarged, such that the handlebar position is eventually raised. However, the handlebar needs to be provided in a position where a rider sitting on the seat is able to extend his or her arms to reach it, and therefore, it becomes difficult to set freely the handlebar position.

SUMMARY OF THE PRESENT INVENTION

The inventor of preferred embodiments of the present invention considered the possibility of enhancing the degree of freedom in setting the handlebar position in order to enhance the usability of the handlebar by the rider by providing the handlebar in a low position where the rider is able to easily extend his or her arms to reach the handlebar. In the vehicle described in International Patent Publication No. 2014/046282, a steering force that is inputted into the handlebar is transmitted to the tie-rod by a single steering shaft. Then, the inventor considered a construction in which a steering shaft is divided into two shafts that are connected to each other, so that a steering force inputted into a handlebar is transmitted to a tie-rod by a mechanism having two shafts.

Compared with the vehicle described in International Patent Publication No. 2014/046282, in the vehicle in which the steering force is transmitted to the tie-rod by the mechanism having two shafts, there are concerns that the vehicle is enlarged in size because a connector is added to connect the two shafts in addition to the one shaft. Further, when attempting to mount on this vehicle a steering lock that locks the right front wheel and the left front wheel so as not to be steered or turned, this may require a further enlargement in size of the vehicle.

Accordingly, preferred embodiments of the present invention provide a vehicle including a steering lock without a risk of enlarging the size of the vehicle while enhancing the usability of the handlebar by the rider.

According to a preferred embodiment of the present invention, a vehicle includes a body frame that is able to lean to the right of the vehicle when the vehicle turns right and is able to lean to the left of the vehicle when the vehicle turns left; a right front wheel and a left front wheel that are aligned side by side in a left-and-right direction of the body frame; a linkage that includes a cross member that turns about a link axis that extends in a front-and-rear direction of the body frame relative to the body frame, supports the right front wheel and the left front wheel so as to be displaced relatively in an up-and-down direction of the body frame, supports the right front wheel so as to turn about a right steering axis that extends in the up-and-down direction of the body frame, and supports the left front wheel so as to turn about a left steering axis that is parallel to the right steering axis; a steering force transmission that includes a steering force input that is disposed between the right steering axis and the left steering axis when seen from the front of the vehicle, is provided so as to turn about a middle steering axis that is parallel to the right steering axis, and transmits a steering force that is inputted into the steering force input to the right front wheel and the left front wheel; and a steering lock that makes it impossible for the right front wheel and the left front wheel to be steered, wherein the steering force transmission includes a rear shaft into which a steering force is inputted from the steering force input and which is able to turn about a rear axis; a front shaft that is disposed ahead of the rear shaft in relation to the front-and-rear direction of the body frame and which is able to turn about a front axis; and a connector that transmits a turning motion of the rear shaft to the front shaft, a distance between the front shaft and the right steering axis is smaller than a distance between the rear shaft and the right steering axis when seen from the side of the vehicle, and the front shaft or a member that turns together with the front shaft and at least a portion of the steering lock that is mounted on a member that is displaced relative to the front shaft or the member are provided in a position that overlaps a movable range of the linkage when seen from the side of the vehicle.

In a preferred embodiment of the present invention, the steering force transmission that transmits the steering force that is inputted into the steering force input to the right front wheel and the left front wheel includes the rear shaft into which the steering force is inputted from the steering force input, the front shaft and the connector that connects the rear shaft and the front shaft together. Due to this, compared with the case where the steering force that is inputted into the steering force input is transmitted to the right front wheel and the left front wheel by the single steering shaft, the degree of freedom in designing the arrangement of the steering force input becomes high. Due to this, the steering force input is able to be disposed in a position or posture that enables a rider to use the steering force input easily to enhance the usability thereof by the rider.

Further, the vehicle is prevented from being enlarged in size for the following reason. The steering force transmission includes the front shaft and the rear shaft. In a preferred embodiment of the present invention, when seen from the side of the vehicle, the distance between the front shaft and the right steering axis is smaller than the distance between the rear shaft and the right steering axis. Namely, the rear shaft is spaced farther away from the linkage than the front shaft. Due to this, it is considered that, in case the steering lock is provided on the circumference of the rear shaft, the interference of the steering lock with the linkage is avoided easily, thus making it possible to prevent the enlargement in size of the vehicle.

In the event that the lock mechanism is provided on the circumference of the rear shaft, however, in case the connector is broken which connects together the rear shaft and the front shaft, the front shaft is able to turn even though the rear shaft is locked, leading to concerns that the locked state of the right front wheel and the left front wheel is released. Due to this, it is necessary that the strength of the connector is enhanced so as not to be broken and that the connector is protected from an external access thereto. The inventor of preferred embodiments of the present invention noticed that in case the strength of the connector is enhanced in the way described above, the connector has to be enlarged in size and an additional cover is necessary to protect the connector, as a result of an enlargement in the size of the vehicle is required.

Then, the inventor studied a challenging provision of the steering lock on the circumference of the front shaft. In case the lock mechanism is disposed on the circumference of the front shaft, even though the connector is broken, the locked state of the right front wheel and the left front wheel is maintained. Due to this, the inventor considered that the vehicle is prevented from being enlarged in size since the necessity is obviated of enhancing the strength of the connector or providing the additional cover to prevent the breakage of the connector.

Firstly, in case the steering lock is attempted to be disposed on the left or right of the front shaft in relation to the left-and-right direction of the body frame, since the front shaft and the linkage are disposed close to each other, the steering lock mechanism easily interferes with the linkage, and hence, it becomes difficult to arrange the steering lock. In order to avoid interference of the steering lock with the linkage, the steering lock has to be placed in a position that is spaced away from the linkage in the left-and-right direction of the body frame, which is not realistic.

Then, it is considered that the steering lock is provided ahead or behind the linkage in relation to the front-and-rear direction of the body frame to provide the steering lock in a position where interference thereof with the linkage is avoided while preventing the enlargement in size of the vehicle. Compared with the vehicle in which the steering force transmission includes a single steering shaft, however, the vehicle in which the steering force transmission includes two shafts of the front shaft and the rear shaft tends to be easily enlarged in size in the front-and-rear direction of the body frame. Due to this, in case the steering lock is provided ahead or behind the linkage in relation to the front-and-rear direction of the body frame, the size of the vehicle is enlarged further in the front-and-rear direction.

Then, the inventor of preferred embodiments of the present invention considered that at least a portion of the steering lock is provided in a position that overlaps a movable range of the linkage when seen from the side of the vehicle. The cross member of the linkage turns about the link axis that extends in the front-and-rear direction of the body frame. Due to this, for example, in case at least a portion of the steering lock is provided on the circumference of the link axis of the cross member, it becomes difficult for the steering lock to interfere with the linkage. The inventor discovered that the steering lock is able to be disposed without interfering with the linkage even in the area which overlaps the movable range of the linkage when seen from the side of the vehicle. In addition, by providing the steering lock, in the way described above, so that at least a portion of the steering lock overlaps the movable range of the linkage when seen from the side of the vehicle, the vehicle is prevented from being enlarged in size in the front-and-rear direction. The movable range of the linkage corresponds to a solid that is defined by an outer edge of an imaginary solid that is defined by the passage of a member defining the linkage when the vehicle is caused to lean from a right maximum banking position to a left maximum banking position. A non-movable range defined by a member such as a headstock that is not displaced when the vehicle is caused to lean may be included inside the movable range of the linkage. In a preferred embodiment of the present invention, when seen from the front of the vehicle that is standing upright, at least a portion of the steering lock is provided above or below the cross member.

Different from the preferred embodiments of the present invention, in the event that at least a portion of the steering lock projects to the left or right of the cross member when seen from the front of the vehicle that is standing upright, the vehicle tends to be enlarged in size in the left-and-right direction. According to the vehicle described above, however, since the steering lock is provided above or below the cross member when seen from the front of the vehicle that is standing upright, it is difficult for the vehicle to be enlarged in size in the left-and-right direction.

In a preferred embodiment of the present invention, when the vehicle is divided into three areas of a right portion, a central portion, and a left portion in the left-and-right direction of the body frame when seen from the front of the vehicle that is standing upright, at least a portion of the steering lock is disposed in the central portion.

According to the vehicle configured as described above, since at least a portion of the steering lock is disposed in the central portion, it becomes difficult for the vehicle to be enlarged in size in the left-and-right direction. The cross member of the linkage turns about the link axis that extends in the front-and-rear direction of the body frame. Due to this, in case at least a portion of the steering lock is disposed in the central portion in the left-and-right direction of the body frame, it becomes difficult for the steering lock to interfere with the linkage.

In a preferred embodiment of the present invention, the connector is preferably a link that is connected to the front shaft or the rear shaft via a turning axis that is different from the front axis or the rear axis so as to turn and which is displaced as the rear shaft turns to turn the front shaft.

According to the vehicle configured as described above, the connector is easily configured, and the degree of freedom in designing the connector is easily enhanced.

In a preferred embodiment of the present invention, the connector preferably includes a right element that is provided on the right of the front shaft in relation to the left-and-right direction of the body frame to connect the front shaft and the rear shaft together, and a left element that is provided on the left of the front shaft in relation to the left-and-right direction of the body frame to connect the front shaft and the rear shaft together.

According to the vehicle configured as described above, compared with the case where the connector connects the front shaft and the rear shaft together by the single element, the rigidity of the connector is easily enhanced.

In a preferred embodiment of the present invention, the steering lock preferably includes a first portion that is attached to the front shaft or a member that turns together with the front shaft; and a second portion that is attached to a member that is displaced relative to the front shaft or the member that turns together with the front shaft, the first portion and the second portion are brought into abutment with each other so as to make it impossible for the first portion and the second portion to be displaced relatively to make it impossible for the right front wheel and the left front wheel to turn, and an abutment between the first portion and the second portion provided on one side of the front shaft in the left-and-right direction of the body frame, and the connector provided on the other side of the front shaft in the left-and-right direction of the body frame.

According to the vehicle configured as described above, the abutment between the first portion and the second portion of the steering lock is disposed on the one side of the front shaft and the connector is disposed on the other side of the front shaft in relation to the left-and-right direction of the body frame.

Consequently, it becomes difficult for the abutment between the first portion and the second portion to interfere with the connector.

In a preferred embodiment of the present invention, the steering lock preferably includes a first portion that is attached to the front shaft or a member that turns together with the front shaft; and a second portion that is attached to a member that is displaced relative to the front shaft or the member that turns together with the front shaft, a pin that is operated by an actuator provided one of the first portion and the second portion, a pin receiver that receives the pin provided on the other of the first portion and the second portion, and the actuator is operated to bring the pin into abutment with the pin receiver so as to make it impossible for the first portion and the second portion to turn relatively to make it impossible for the right front wheel and the left front wheel to turn.

According to the vehicle configured as described above, the pin is able to be brought into abutment with the pin receiver by the actuator, which obviates the necessity of disposing the steering lock in a position where the rider is able to easily reach the steering lock to operate it manually. Due to this, the steering lock is provided, for example, in an interior of the vehicle to which it is difficult to access from the exterior, thus enhancing the degree of freedom in the arrangement of the steering lock.

In a preferred embodiment of the present invention, the front axis and the rear axis are preferably parallel to each other.

According to the vehicle configured as described above, since the front axis and the rear axis are parallel, the necessity is obviated of using a complex construction to transmit a steering force from the rear shaft to the front shaft by changing the turning angle, thus making it possible to configure the connector by using the simple construction.

In a preferred embodiment of the present invention, a steering stopper that restricts a maximum steering angle of the right front wheel and the left front wheel is preferably mounted on the front shaft or the member that turns together with the front shaft and a member that is displaced relative to the front shaft when the front shaft turns, and at least a portion of the steering stopper is provided in a position that overlaps a movable range of the linkage when seen from the side of the vehicle.

High rigidity is also required of the steering stopper and the members on which the steering stopper are mounted as is required of the steering lock and the members on which the steering lock is mounted. High rigidity is required of the steering stopper so as to handle an external force that is exerted on the right front wheel, the left front wheel and the steering force input in an attempt to increase further the steering angle of the right front wheel and the left front wheel in such a state that the right front wheel and the left front wheel are steered to the maximum steering angle. In addition, high rigidity is also required of a member on which the steering stopper is mounted.

Then, according to the vehicle configured as above, the front shaft or the member that turns together with the front shaft and the member that is displaced relative to the front shaft, on all of which the steering lock is mounted, have a high rigidity. Since the steering stopper is mounted on these members having a high rigidity, the supporting rigidity of the steering stopper is high.

In a preferred embodiment of the present invention, a steering stopper that restricts a maximum steering angle of the right front wheel and the left front wheel is preferably mounted on the rear shaft or a member that turns together with the rear shaft and a member that is displaced relative to the rear shaft when the rear shaft turns.

According to the vehicle configured as described above, since it is difficult for the steering stopper to interfere with the linkage, it is difficult for the vehicle to be enlarged in size.

In a preferred embodiment of the present invention, the front shaft on which the steering lock is provided is preferably thicker than the rear shaft.

According to the vehicle configured as described above, the steering lock is supported with high rigidity by using the front shaft having a high rigidity.

In a preferred embodiment of the present invention, the linkage preferably includes a right side member that supports the right front wheel so as to turn about a right steering axis that extends in an up-and-down direction of the body frame; and a left side member that supports the left front wheel so as to turn about a left steering axis that is parallel to the right steering axis, the cross member preferably includes an upper cross member that supports an upper portion of the right side member at a right end thereof so as to allow the upper portion to turn about a right upper axis that extends in a front-and-rear direction of the body frame, supports an upper portion of the left side member at a left end thereof so as to allow the upper portion to turn about a left upper axis that is parallel to the right upper axis, and which is supported on the body frame at a middle portion thereof so as to turn about a middle upper axis that is parallel to the right upper axis; and a lower cross member that supports a lower portion of the right side member at a right end thereof so as to allow the lower portion to turn about a right lower axis that extends in the front-and-rear direction of the body frame, supports a lower portion of the left side member at a left end thereof so as to allow the lower portion to turn about a left lower axis that is parallel to the right upper axis, and which is supported on the body at a middle portion thereof so as to turn about a middle lower axis that is parallel to the right upper axis, and the front shaft on which the steering lock is provided is preferably longer than a distance between the middle upper axis and the middle lower axis.

According to the vehicle configured as described above, the steering lock is provided at any location along the axial direction of the long front shaft. The degree of freedom in selecting the location where to place the steering lock is enhanced. Since the degree of freedom in selecting the location where to place the steering lock is high, for example, the steering lock is able to be provided at a location where it becomes difficult for the steering lock to interfere with the other members.

In a preferred embodiment of the present invention, the front shaft on which the steering lock is provided is preferably thicker than an upper end of the right side member or an upper end of the left side member.

According to the vehicle configured as described above, it is easy to ensure the rigidity of the front shaft.

In a preferred embodiment of the present invention, the front shaft on which the steering lock is provided is preferably longer than the right side member or the left side member.

According to the vehicle configured as described above, the steering lock is provided at any location along the axial direction of the long front shaft. The degree of freedom in selecting the location where to place the steering lock is enhanced. Since the degree of freedom in selecting the location where to place the steering lock is high, for example, the steering lock is provided at a location where it becomes difficult for the steering lock to interfere with the other members.

In a preferred embodiment of to the present invention, the cross member preferably includes an upper cross member and a lower cross member that is provided below the upper cross member, the body frame includes an upper support that supports the upper cross member so as to turn and a lower support that supports the lower cross member so as to turn, and the front shaft may penetrate the body frame so that the front shaft passes the upper support and the lower support when seen from the front of the vehicle.

According to the vehicle configured as described above, a portion of the body frame where the upper support and the lower support are provided is has an enhanced rigidity in order to support the upper cross member and the lower cross member with high rigidity. The front shaft penetrates a portion of the body frame whose rigidity is enhanced, and therefore, the vehicle is compact in size while avoiding interference of the linkage with the steering force transmission. In particular, in the event that a portion of the body frame where the upper support and the lower support are provided includes the pipe-shaped member, a portion of the body frame is highly rigid and light in weight. In case the front shaft penetrates the interior of the pipe-shaped body frame, the vehicle is compact in size while avoiding interference of the linkage with the steering force transmission.

In a preferred embodiment of the present invention, the body frame preferably includes a link support that supports the cross member so as to turn, the cross includes a front cross element that is disposed ahead of the link support and a rear cross element that is disposed behind the link support, and the front axis of the front shaft is disposed between a front end of the front cross element and a rear end of the rear cross element.

According to the vehicle configured as described above, when the linkage is operated, the front cross element and the rear cross element turn about the link axis that extends in the front-and-rear direction of the body frame. Consequently, even though the front shaft is provided between the front cross element and the rear cross element, the front shaft does not interfere with the front cross element and the rear cross element when the linkage is operated. Thus, the vehicle is compact in size while preventing the interference described above.

In a preferred embodiment of the present invention, the body frame preferably includes a pipe-shaped link support that supports the cross member so as to turn, the front shaft is coaxial with the pipe-shaped link support, and at least a portion of the front shaft is inserted into an interior of the pipe-shaped link support.

According to the vehicle configured as described above, the link support that supports the cross member so as to turn includes the pipe-shaped member, and therefore, the link support is highly rigid and light in weight. At least a portion of the front shaft is inserted into the interior of the pipe-shaped link support, and therefore, the vehicle is compact in size while the link support is highly rigid and light in weight and avoids interference of the linkage with the steering force transmission.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
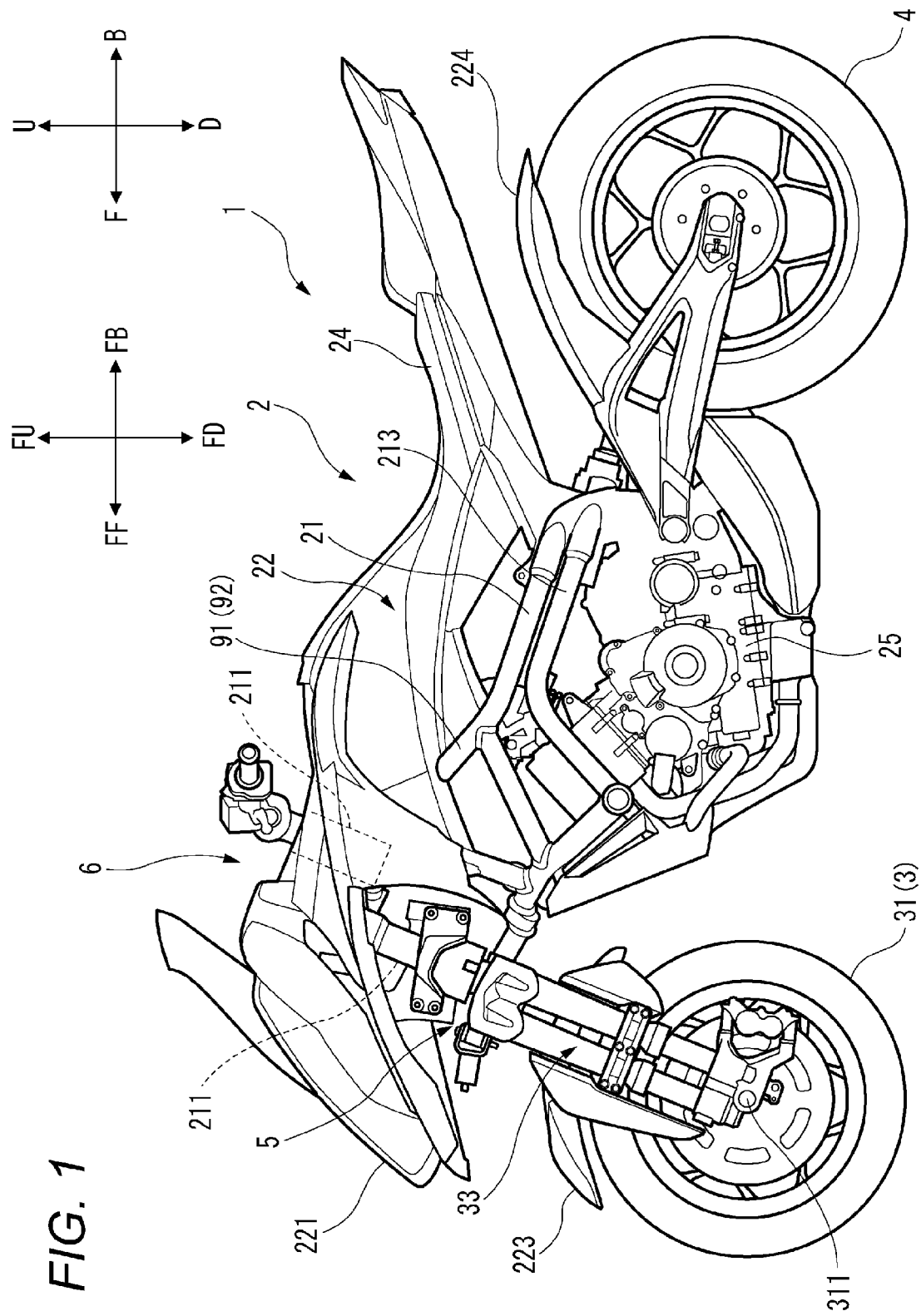
FIG. 1 is a side view showing an entire vehicle according to a preferred embodiment of the present invention as seen from a left side thereof.

Referring to the accompanying drawings, preferred embodiments of the present invention be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-and-right direction of the vehicle relative to a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-and-rear direction of the body frame," a "left-and-right direction of the body frame" and an "up-and-down direction of the body frame" mean a front-and-rear direction, a left-and-right direction and an up-and-down direction based on the body frame as viewed from a rider who rides the vehicle. "A side of or sideways of the body frame" means directly on the right or left of the body frame. "A side of or sideways of the body frame" means directly on the right or left of the body frame.

In this description, an expression reading "something extends in the front-and-rear direction of the body frame" includes a situation in which something extends while being inclined in relation to the front-and-rear direction of the body frame and means that something extends with a gradient which is closer to the front-and-rear direction of the body frame rather than the left-and-right direction and the up-and-down direction of the body frame.

In this description, an expression reading "something extends in the left-and-right direction of the body frame" includes a situation in which something extends while being inclined in relation to the left-and-right direction of the body frame and means that something extends with a gradient which is closer to the left-and-right direction of the body frame rather than the front-and-rear direction of the body frame and the up-and-down direction of the body frame.

In this description, an expression reading "something extends in the up-and-down direction of the body frame" includes a situation in which something extends while being inclined in relation to the up-and-down direction of the body frame and means that something extends with a gradient which is closer to the up-and-down direction of the body frame rather than the front-and-rear direction of the body frame and the left-and-right direction of the body frame.

In this description, an expression reading the "body frame stands upright or is in an upright state" means a state in which the up-and-down direction of the body frame coincides with the vertical direction in such a state that the vehicle is not steered at all. In this state, the directions based on the vehicle and the directions based on the vehicle frame coincide with each other. When the vehicle is turning with the body frame caused to lean to the left or right direction from the vertical direction, the left-and-right direction of the vehicle does not coincide with the left-and-right direction of the body frame. Likewise, the up-and-down direction of the vehicle does not coincide with the up-and-down direction of the body frame. However, the front-and-rear direction of the vehicle coincides with the front-and-rear direction of the body frame.

In this description, "rotation or rotating" means that a member is displaced at an angle of 360 degrees or more about a center axis thereof. In this description, "turning" means that a member is displaced at an angle of less than 360 degrees about a center axis thereof.

Referring to FIGS. 1 to 7, a vehicle 1 according to preferred embodiments of the present invention will be described. The vehicle 1 is a vehicle which is driven by power generated from a power source and which includes a body frame which is able to leans and two front wheels which are aligned side by side in a left-and-right direction of the body frame.

FIG. 1 is a left side view showing the entire vehicle 1 as viewed from the left thereof. The vehicle 1 includes a vehicle main body portion 2, a pair of left and right front wheels 3, a rear wheel 4, a linkage 5 and a steering force transmission 6.

The vehicle main body portion 2 includes a body frame 21, a body cover 22, a seat 24 and an engine unit 25. In FIG. 1, the vehicle 1 is standing upright or is in an upright state. The following description which will be made by reference to FIG. 1 is based on the premise that the vehicle 1 is standing in the upright state.

The body frame 21 extends in the front-and-rear direction of the vehicle 1. The body frame 21 includes a headstock 211 (refer to FIG. 4: an example of a rear shaft support), a link support 212 (refer to FIG. 4: an example of a front shaft support), an engine support 213, a left frame 91 and a right frame 92.

The headstock 211 supports an upstream side steering shaft 60, which will be described below, so as to turn. The headstock 211 extends in an up-and-down direction of the body frame 21. The link support 212 is provided ahead of the headstock 211 in a front-and-rear direction of the vehicle 1. The link support 212 supports the linkage 5 so as to turn.

The engine support 213 is provided behind the headstock 211 in the front-and-rear direction of the vehicle 1. The engine support 213 supports the engine unit 25. The engine unit 25 supports the rear wheel 4 so as to allow the rotation thereof. The engine unit 25 includes a power source such as an engine, an electric motor, a battery or the like and a device such as a transmission. The power source generates a force by which the vehicle 1 is driven.

The right frame 92 is provided on the right of the left frame 91 in relation to a left-and-right direction of the vehicle. The right frame 92 and the left frame 91 preferably have a laterally symmetrical shape. The left frame 91 and the right frame 92 connect the headstock 211, the link support 212 and the engine support 213 together.

The body cover 22 includes a front cover 221, a pair of left and right front mudguards 223 and a rear mudguard 224. The body cover 22 is a body cover which covers at least a portion of body elements which are mounted on the vehicle 1 such as the pair of left and right front wheels 3, the body frame 21, the linkage 5 and the like.

The front cover 221 is disposed ahead of the seat 24. The front cover 221 covers the linkage 5 and at least a portion of the steering force transmission 6.

At least portions of the pair of left and right front mudguards 223 are individually disposed directly below the front cover 221. At least portions of the pair of left and right front mudguards 223 are disposed directly above the pair of left and right front wheels 3, respectively.

At least a portion of the rear mudguard 224 is disposed directly above the rear wheel 4.

At least portions of the pair of left and right front wheels 3 are disposed directly below the front cover 221.

At least portion of the rear wheel 4 is disposed below the seat 24. At least portion of the rear wheel 4 is disposed directly below the rear fender 224.

Figure 2:
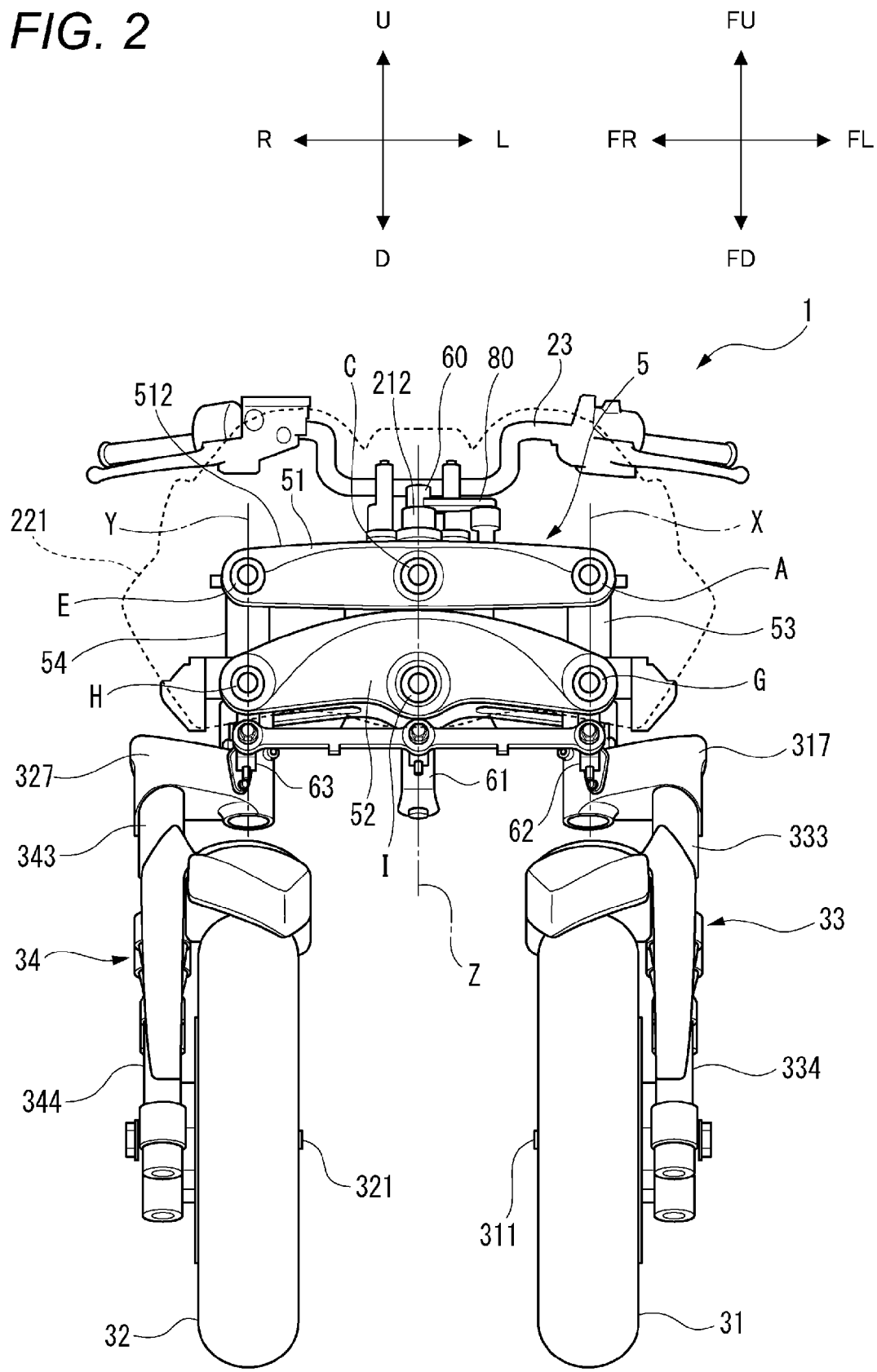
FIG. 2 is a front view showing a front portion of the vehicle shown in FIG. 1.

FIG. 2 is a front view of the front portion of the vehicle 1 as viewed from the front of the body frame 21. In FIG. 2, the vehicle 1 is standing in an upright state. The following description which will be made by reference to FIG. 2 is based on the premise that the vehicle 1 is standing upright or in the upright state. FIG. 2 shows the front portion of the vehicle 1 as seen through the front cover 221 that is indicated by dashed lines.

The pair of left and right front wheels 3 include a left front wheel 31 and a right front wheel 32. The left front wheel 31 and the right front wheel 32 are aligned side by side in the left-and-right direction of the body frame 21. The right front wheel 32 is provided on the right of the left front wheel 31 on the body frame 21.

The vehicle 1 includes a left shock absorber 33, a right shock absorber 34, a left bracket 317 and a right bracket 327.

Figure 3:
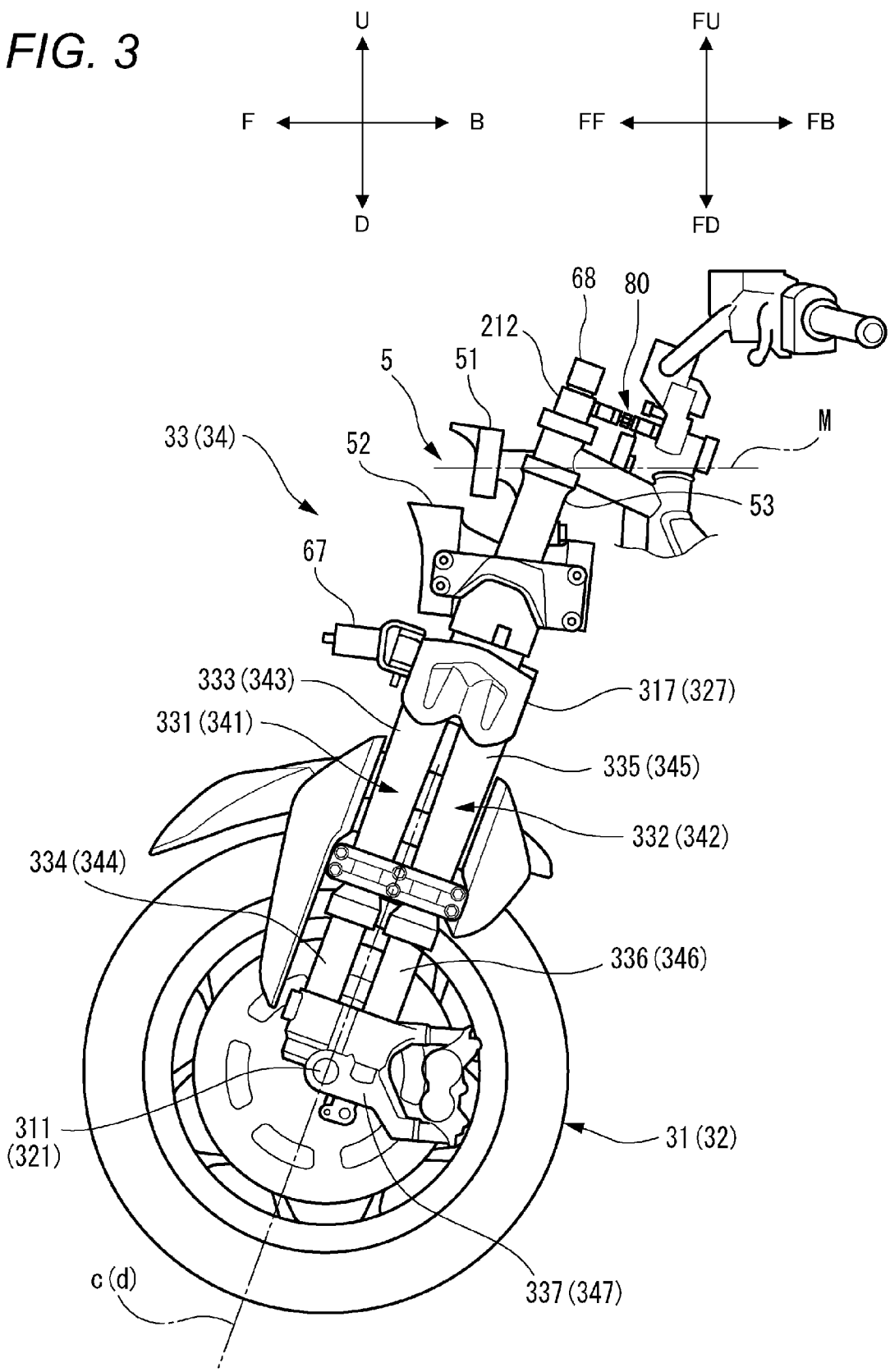
FIG. 3 is a side view showing a left shock absorber and a left front wheel.

FIG. 3 is a side view showing the left shock absorber 33 and the left front wheel 31. The right shock absorber 34 and the left shock absorber 33 are preferably constructed laterally symmetrically with each other, and therefore, reference numerals denoting the right shock absorber 34 are also written in FIG. 3. As shown in FIG. 3, the left shock absorber 33 is preferably a so-called telescopic shock absorber. The left shock absorber 33 includes a left front telescopic element 331, a left rear telescopic element 332 and a left inner connecting element 337.

The left front telescopic element 331 includes a left front outer tube 333 and a left front inner tube 334. A lower portion of the left front inner tube 334 is connected to the left inner connecting element 337. An upper portion of the left front inner tube 334 is inserted into the left front outer tube 333. An upper portion of the left front outer tube 333 is connected to the left bracket 317. The left front inner tube 334 is displaced relative to the left front outer tube 333 along a left extending and contracting axis c that extends in the up-and-down direction of the body frame 21. The left front telescopic element 331 is able to extend and contract in the direction of the left extending and contracting axis c as a result of the left front inner tube 334 being displaced relative to the left front outer tube 333 along the left extending and contracting axis c.

At least a portion of the left rear telescopic element 332 is provided behind the left front telescopic element 331. The left rear telescopic element 332 includes a left rear outer tube 335 and a left rear inner tube 336. The left rear outer tube 335 and the left front outer tube 333 are connected together so as not to move. A lower portion of the left rear inner tube 336 is connected to the left inner connecting element 337. An upper portion of the left rear inner tube 336 is inserted into the left rear outer tube 335. An upper portion of the left rear outer tube 335 is connected to the left bracket 317. The left rear inner tube 336 is displaced relative to the left rear outer tube 335 along the left extending and contracting axis c that extends in the up-and-down direction of the body frame 21. The left rear telescopic element 332 is able to extend and contract in the direction of the left extending and contracting axis c as a result of the left rear inner tube 336 being displaced relative to the left rear outer tube 335 along the left extending and contracting axis c.

The left inner connecting element 337 rotatably supports a left axle member 311 of the left front wheel 31. The left inner connecting element 337 connects a lower portion of the left front inner tube 334 and a lower portion of the left rear inner tube 336 together.

The left shock absorber 33 attenuates the displacement of the left front wheel 31 relative to the left front outer tube 333 and the left rear outer tube 335 along the left extending and contracting axis c as a result of the left front telescopic element 331 extending or contracting and the left rear telescopic element 332 extending or contracting.

As shown in FIG. 3, the right shock absorber 34 is preferably a so-called telescopic shock absorber. The right shock absorber 34 includes a right front telescopic element 341, a right rear telescopic element 342 and a right inner connecting element 347.

The right front telescopic element 341 includes a right front outer tube 343 and a right front inner tube 344. A lower portion of the right front inner tube 344 is connected to the right inner connecting element 347. An upper portion of the right front inner tube 344 is inserted into the right front outer tube 343. An upper portion of the right front outer tube 343 is connected to the right bracket 327. The right front inner tube 344 is displaced relative to the right front outer tube 343 along a right extending and contracting axis d that extends in the up-and-down direction of the body frame 21. The right front telescopic element 341 is able to extend and contract in the direction of the right extending and contracting axis d as a result of the right front inner tube 344 being displaced relative to the right front outer tube 343 along the right extending and contracting axis d.

At least a portion of the right rear telescopic element 342 is provided behind the right front telescopic element 341. The right rear telescopic element 342 includes a right rear outer tube 345 and a right rear inner tube 346. The right rear outer tube 345 and the right front outer tube 343 are connected together so as not to move. A lower portion of the right rear inner tube 346 is connected to the right inner connecting element 347. An upper portion of the right rear inner tube 346 is inserted into the right rear outer tube 345. An upper portion of the right rear outer tube 345 is connected to the right bracket 327. The right rear inner tube 346 is displaced relative to the right rear outer tube 345 along the right extending and contracting axis d that extends in the up-and-down direction of the body frame 21. The right rear telescopic element 342 is able to extend and contract in the direction of the right extending and contracting axis d as a result of the right rear inner tube 346 being displaced relative to the right rear outer tube 345 along the right extending and contracting axis d.

The right inner connecting element 347 rotatably supports a right axle member 321 of the right front wheel 32. The right inner connecting element 347 connects a lower portion of the right front inner tube 344 and a lower portion of the right rear inner tube 346 together.

The right shock absorber 34 attenuates the displacement of the right front wheel 32 relative to the right front outer tube 343 and the right rear outer tube 345 along the right extending and contracting axis d as a result of the right front telescopic element 341 extending or contracting and the right rear telescopic element 342 extending or contracting.

Figure 4:
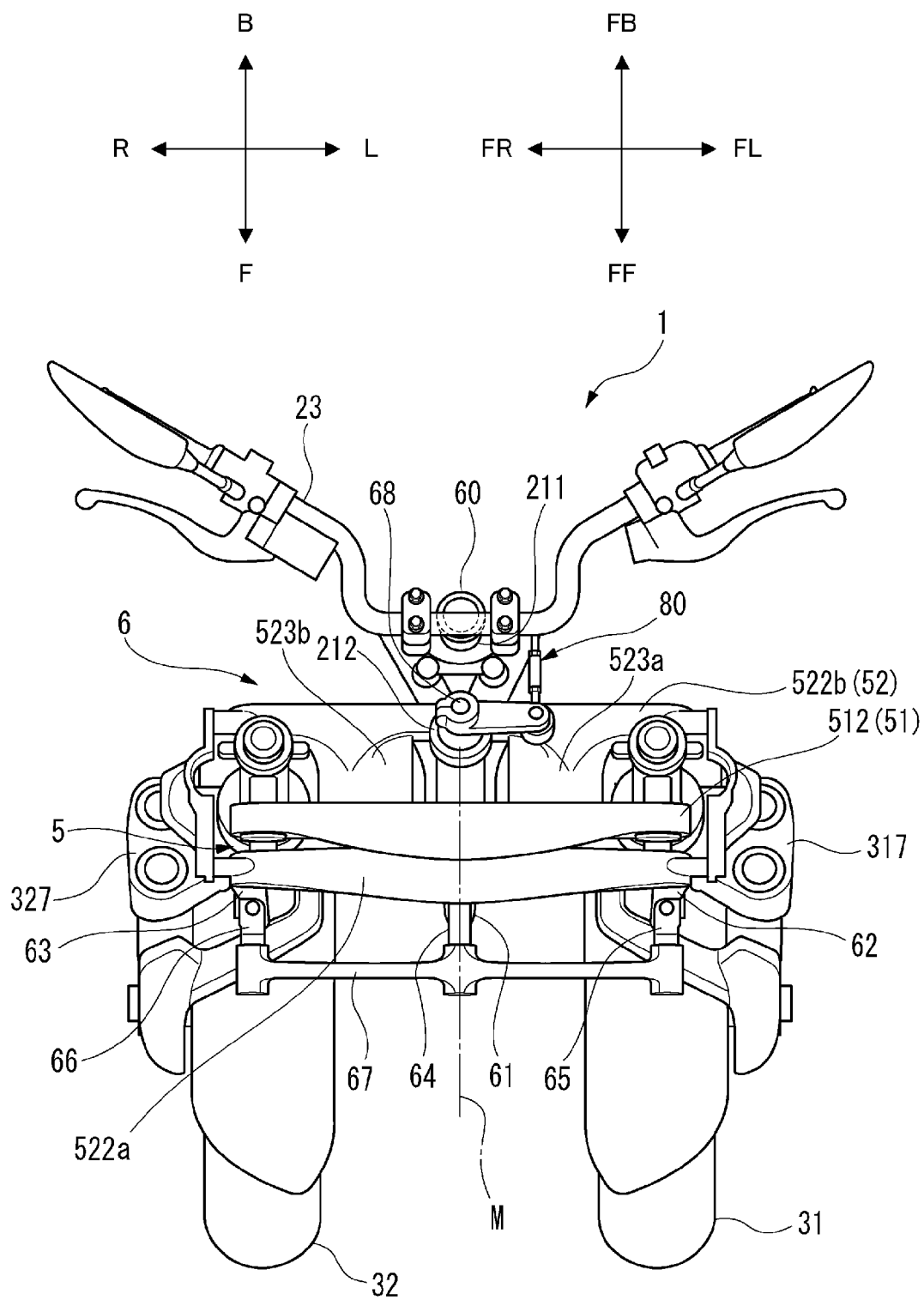
FIG. 4 is a plan view showing the front portion of the vehicle shown in FIG. 1.

As shown in FIG. 4, the vehicle 1 includes the steering force transmission 6. The steering force transmission 6 includes a handlebar 23 (an example of a steering force input), the upstream side steering shaft 60 (the example of the rear shaft), a connector 80, and a downstream side steering shaft 68 (an example of a front shaft).

The body frame 21 includes the headstock 211 that supports the upstream side steering shaft 60 so as to turn and the link support 212 that supports the downstream side steering shaft 68 so as to turn. The link support 212 extends in the direction of a middle center axis Z that extends in the up-and-down direction of the body frame 21, as shown in FIG. 2. In the present preferred embodiment, a turning center (a central steering axis) of the handlebar 23 coincides with a turning center (a rear axis) of the upstream side steering shaft.

A steering force is inputted into the handlebar 23. The upstream side steering shaft 60 is connected to the handlebar 23. An upper portion of the upstream side steering shaft 60 is disposed behind a lower portion of the upstream side steering shaft 60 in a front-and-rear direction of the body frame 21. The upstream side steering shaft 60 is supported in the headstock 211 so as to turn.

The connector 80 connects the upstream side steering shaft 60 and the downstream side steering shaft 68 together. The connector 80 is displaced as the upstream side steering shaft 60 turns. The connector 80 transmits the turning motion of the upstream side steering shaft 60 to the downstream side steering shaft 68.

The downstream side steering shaft 68 is supported in the link support 212 so as to turn. The downstream side steering shaft 68 is connected to the connector 80. The downstream side steering shaft 68 is provided ahead of the upstream side steering shaft 60 in the front-and-rear direction of the body frame 21. The downstream side steering shaft 68 turns as the connector 80 is displaced. As a result of the downstream side steering shaft 68 turning, the left front wheel 31 and the right front wheel 32 are steered via a tie-rod 67.

The steering force transmission 6 transmits a steering force exerted on the handlebar 23 by the rider when operating the handlebar 23 to the left bracket 317 and the right bracket 327. A specific configuration will be described in detail below.

In the vehicle 1 according to the present preferred embodiment, the linkage 5 preferably uses a four parallel joint link system (also referred to as a parallelogram link).

As shown in FIG. 2, the linkage 5 is disposed above the left front wheel 31 and the right front wheel 32. The linkage 5 includes an upper cross member 51, a lower cross member 52, a left side member 53 and a right side member 54. The linkage 5 is supported so as to turn by the link support 212 that extends in the direction of the middle center axis Z.

Even though the upstream side steering shaft 60 is turned as a result of the operation of the handlebar 23, the linkage 5 is prevented from following the rotation of the upstream side steering shaft 60 and does not turn.

The upper cross member 51 includes a plate member 512. The plate member 512 is disposed ahead of the link support 212. The plate member 512 extends in the left-and-right direction of the body frame 21.

A middle portion of the upper cross member 51 is connected to the link support 212 by a connecting portion C. The upper cross member 51 is able to turn relative to the link support 212 about a middle upper axis M that passes through the connecting portion C and extends in the front-and-rear direction of the body frame 21.

A left end of the upper cross member 51 is connected to the left side member 53 by a connecting portion A. The upper cross member 51 is able to turn relative to the left side member 53 about a left upper axis that passes through the connecting portion A to extend in the front-and-rear direction of the body frame 21.

A right end of the upper cross member 51 is connected to the right side member 54 by a connecting portion E. The upper cross member 51 is able to turn relative to the right side member 54 about a right upper axis that passes through the connecting portion E to extend in the front-and-rear direction of the body frame 21.

FIG. 4 is a plan view of the front portion of the vehicle 1 as seen from above the body frame 21. In FIG. 4, the vehicle 1 is standing upright. The following description which will be made by reference to FIG. 4 is based on the premise that the vehicle 1 is standing upright.

As shown in FIG. 4, the lower cross member 52 includes a front plate member 522a and a rear plate member 522b. The front plate member 522a is disposed ahead of the link support 212. The rear plate member 522b is disposed behind the link support 212. The front plate member 522a and the rear plate member 522b extend in the left-and-right direction of the body frame 21. The front plate member 522a and the rear plate member 522b are connected together by a left connecting block 523a and a right connecting block 523b. The left connecting block 523a is disposed on the left of the link support 212. The right connecting block 523b is disposed on the right of the link support 212.

Returning to FIG. 2, the lower cross member 52 is disposed below the upper cross member 51. The lower cross member 52 extends parallel to the upper cross member 51. A middle portion of the lower cross member 52 is connected to the link support 212 by a connecting portion I. The lower cross member 52 is able to turn about a middle lower axis that passes through the connecting portion I to extend in the front-and-rear direction of the body frame 21.

A left end of the lower cross member 52 is connected to the left side member 53 by a connecting portion G. The lower cross member 52 is able to turn about a left lower axis that passes through the connecting portion G to extend in the front-and-rear direction of the body frame 21.

A right end of the lower cross member 52 is connected to the right side member 54 by a connecting portion H. The lower cross member 52 is able to turn about a right lower axis that passes through the connecting portion H to extend in the front-and-rear direction of the body frame 21. A length of the upper cross member 51 from the connecting portion E to the connecting portion A is substantially equal to a length of the lower cross member from the connecting portion H to the connecting portion G.

The middle upper axis M, the right upper axis, the left upper axis, the middle lower axis, the right lower axis and the left lower axis extend parallel to one another. The middle upper axis M, the right upper axis, the left upper axis, the middle lower axis, the right lower axis and the left lower axis are disposed above the left front wheel 31 and the right front wheel 32.

As shown in FIGS. 2 and 4, the left side member 53 is disposed on the left of the link support 212. The left side member 53 is disposed above the left front wheel 31. The left side member 53 extends parallel to the middle center axis Z of the link support 212. An upper portion of the left side member 53 is disposed behind a lower portion thereof.

A lower portion of the left side member 53 is connected to the left bracket 317. The left bracket 317 is able to turn about a left center axis X relative to the left side member 53. The left center axis X extends parallel to the middle center axis Z of the link support 212.

As shown in FIGS. 2 and 4, the right side member 54 is disposed on the right of the link support 212. The right side member 54 is disposed above the right front wheel 32. The right side member 54 extends parallel to the middle center axis Z of the link support 212. An upper portion of the right side member 54 is disposed behind a lower portion thereof.

A lower portion of the right side member 54 is connected to the right bracket 327. The right bracket 327 is able to turn about a right center axis Y relative to the right side member 54. The right center axis X extends parallel to the middle center axis Z of the link support 212.

Thus, as has been described above, the upper cross member 51, the lower cross member 52, the left side member 53 and the right side member 54 are supported by the link support 212 so that the upper cross member 51 and the lower cross member 52 are held in postures which are parallel to each other and so that the left side member 53 and the right side member 54 are held in postures which are parallel to each other.

As shown in FIGS. 2 and 4, the steering force transmission 6 includes a middle transmission plate 61, a left transmission plate 62, a right transmission plate 63, a middle joint 64, a left joint 65, a right joint 66, and the tie-rod 67.

The middle transmission plate 61 is connected to a lower portion of the downstream side steering shaft 68. The middle transmission plate 61 cannot turn relative to the downstream side steering shaft 68. The middle transmission plate 61 is able to turn about the middle center axis Z relative to the link support 212.

The left transmission plate 62 is disposed on the left of the middle transmission plate 61. The left transmission plate 62 is connected to the left bracket 317. The left transmission plate 62 cannot turn relative to the left bracket 317. The left transmission plate 62 is able to turn about the left center axis X relative to the left side member 53.

The right transmission plate 63 is disposed on the right of the middle transmission plate 61. The right transmission plate 63 is connected to the right bracket 327. The right transmission plate 63 cannot turn relative to the right bracket 327. The right transmission plate 63 is able to turn about the right center axis Y relative to the right side member 54.

As shown in FIG. 4, the middle joint 64 is connected to a front portion of the middle transmission plate 61 via a shaft that extends in the up-and-down direction of the body frame 21. The middle transmission plate 61 and the middle joint 64 are allowed to turn relative to each other about this shaft.

The left joint 65 is disposed directly on the left of the middle joint 64. The left joint 65 is connected to a front portion of the left transmission plate 62 via a shaft that extends in the up-and-down direction of the body frame. The left transmission plate 62 and the left joint 65 are able to turn relative to each other about this shaft.

The right joint 66 is disposed directly on the right of the middle joint 64. The right joint 66 is connected to a front portion of the right transmission plate 63 via a shaft that extends in the up-and-down direction of the body frame. The right transmission plate 63 and the right joint 66 are able to turn relative to each other about this shaft.

A shaft that extends in the front-and-rear direction of the body frame 21 is provided at a front portion of the middle joint 64. A shaft that extends in the front-and-rear direction of the body frame 21 is provided at a front portion of the left joint 65. A shaft that extends in the front-and-rear direction of the body frame 21 is provided at a front portion of the right joint 66.

The tie-rod 67 extends in the left-and-right direction of the body frame 21. The tie-rod 67 is connected to the middle joint 64, the left joint 65 and the right joint 66 via those shafts. The tie-rod 67 and the middle joint 64 are able to turn relative to each other about the shaft that is provided at the front portion of the middle joint 64. The tie-rod 67 and the left joint 65 are able to turn relative to each other about the shaft that is provided at the front portion of the left joint 65. The tie-rod 67 and the right joint 66 are able to turn relative to each other about the shaft that is provided at the front portion of the right joint 66.

Figure 5:
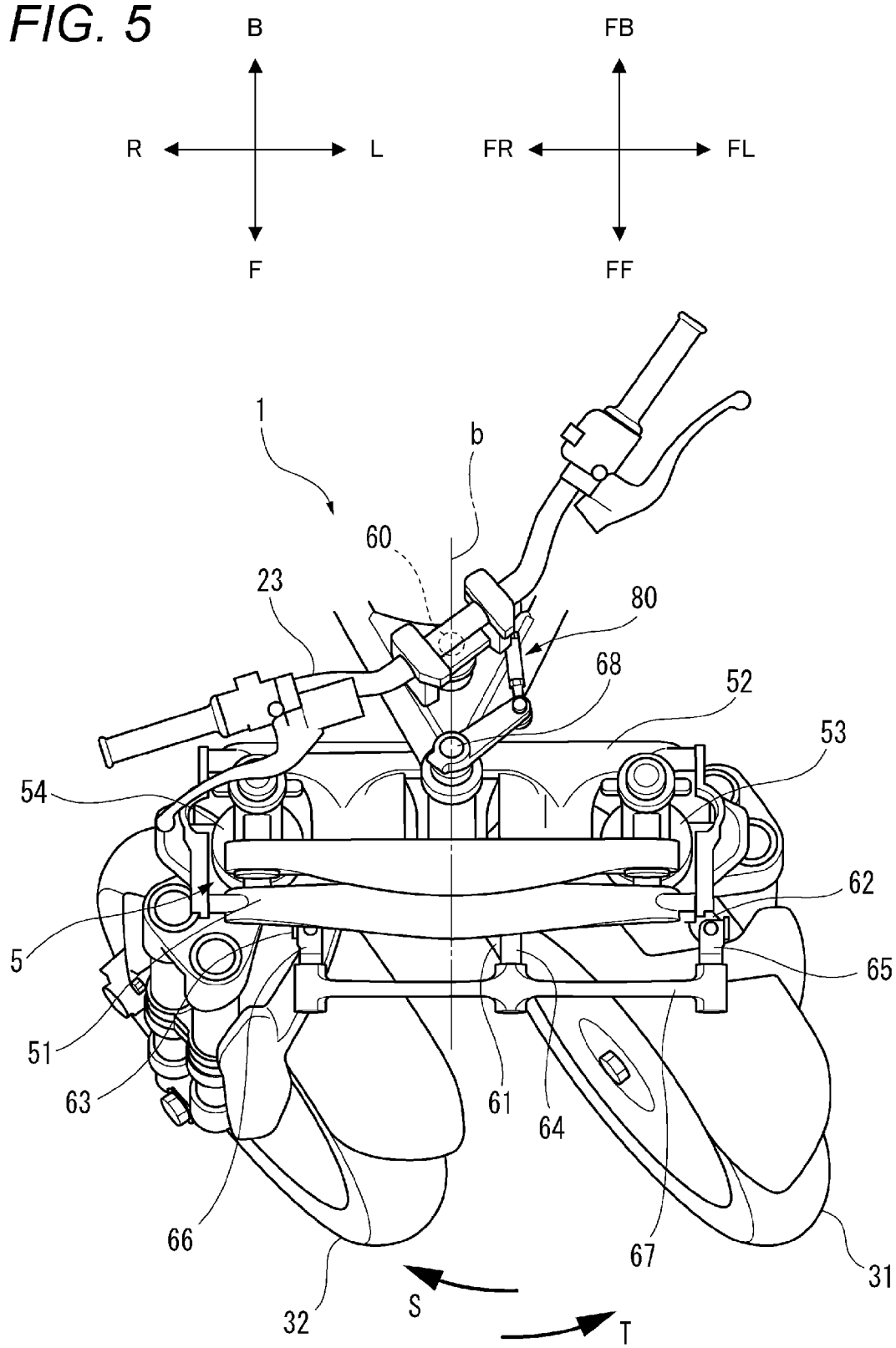
FIG. 5 is a plan view showing the front portion of the vehicle shown in FIG. 1 when the vehicle is steered.

Next, referring to FIGS. 4 and 5, a steering operation of the vehicle 1 will be described. FIG. 5 is a plan view, as seen from above the body frame 21, of the front portion of the vehicle 1 in such a state that the left front wheel 31 and the right front wheel 32 are steered or turned to the left.

When the rider operates the handlebar 23, the upstream side steering shaft 60 turns. The turning motion of the upstream side steering shaft 60 is transmitted to the downstream side steering shaft 68 via the connector 80. The downstream side steering shaft 68 turns relative to the link support 212 about a front steering axis b. In the case of the vehicle 1 being steered to the left as shown in FIG. 5, as the handlebar 23 is operated, the middle transmission plate 61 turns relative to the link support 212 in a direction indicated by an arrow T about the front steering axis b.

In association with the turning of the middle transmission plate 61 in the direction indicated by the arrow T, the middle joint 64 of the tie-rod 67 turn relative to the middle transmission plate 61 in a direction indicated by an arrow S. This moves the tie-rod 67 leftwards and rearwards while keeping its posture as it is.

As the tie-rod 67 moves leftwards and rearwards, the left joint 65 and the right joint 66 of the tie-rod 67 turn in the direction indicated by the arrow S relative to the left transmission plate 62 and the right transmission plate 63, respectively. This turns the left transmission plate 62 and the right transmission plate 63 in the direction indicated by the arrow T while allowing the tie-rod 67 to keep its posture.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorber 33, which is connected to the left bracket 317 via the left front outer tube 333 and the left rear outer tube 335, turns in the direction indicated by the arrow T about the left center axis X relative to the left side member 53. When the left shock absorber 33 turns in the direction indicated by the arrow T, the left front wheel 31, which is supported on the left shock absorber 33, turns in the direction indicated by the arrow T about the left center axis X relative to the left side member 53.

When the right bracket 327 turns in the direction indicated by the arrow T, the right shock absorber 34, which is connected to the right bracket 327 via the right front outer tube 343 and the right rear outer tube 345, turns in the direction indicated by the arrow T about the right center axis Y relative to the right side member 54. When the right shock absorber 34 turns in the direction indicated by the arrow T, the right front wheel 32, which is supported on the right shock absorber 34, turns in the direction indicated by the arrow T about the right center axis Y relative to the right side member 54.

When the rider operates the handlebar 23 so as to turn to the right, the elements described above turn in the direction indicated by the arrow S. Since the elements only move the other way around in relation to the left-and-right direction, the detailed description thereof will be omitted here.

Thus, as has been described heretofore, as the rider operates the handlebar 23, the steering force transmission 6 transmits the steering force accordingly to the left front wheel 31 and the right front wheel 32. The left front wheel 31 and the right front wheel 32 turn about the left center axis X and the right center axis Y, respectively, in the direction corresponding to the direction in which the handlebar 23 is operated by the rider.

Figure 6:
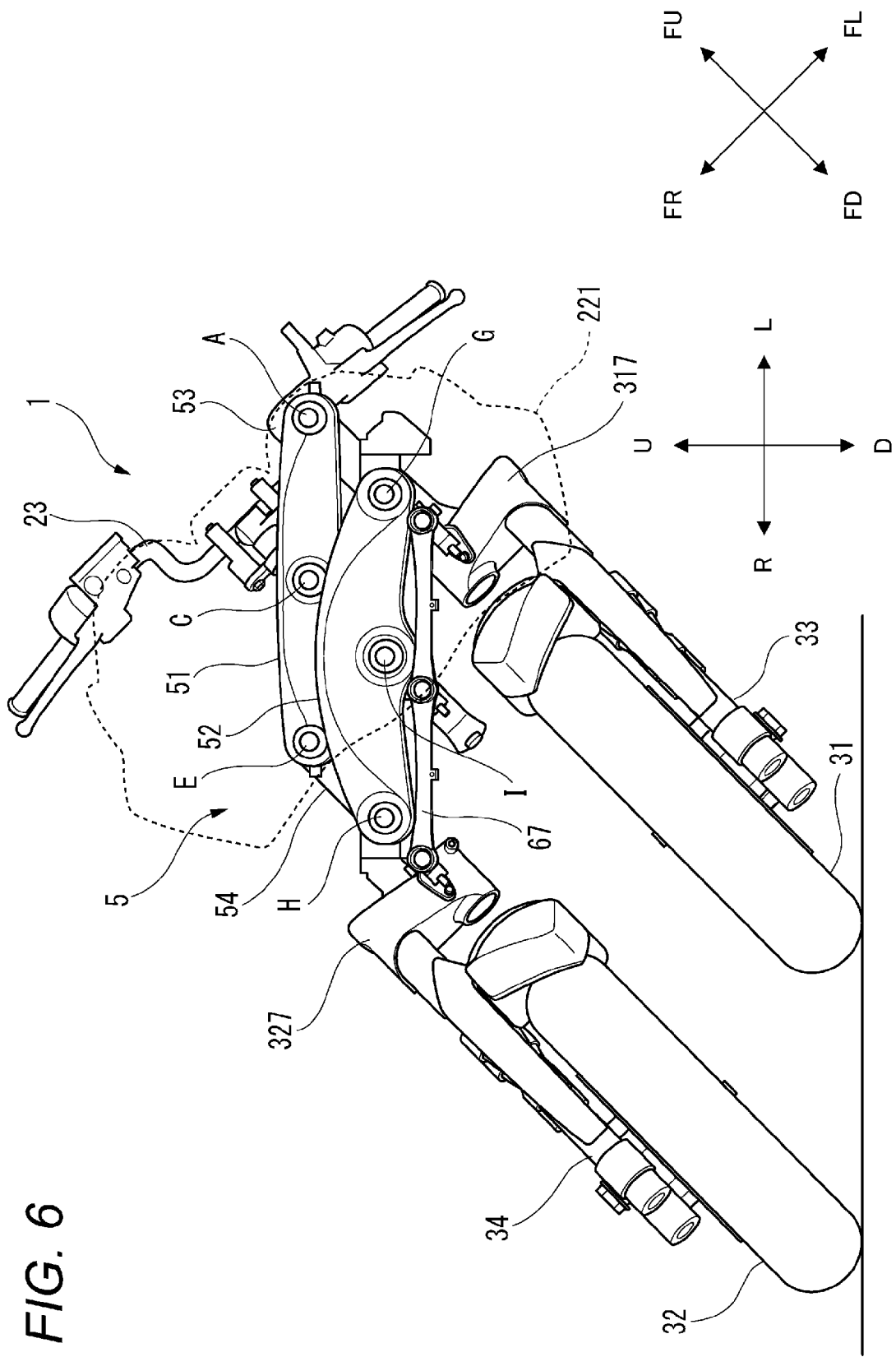
FIG. 6 is a front view showing the front portion of the vehicle shown in FIG. 1 when the vehicle is caused to lean.

Next, referring to FIGS. 2 and 6, a leaning operation of the vehicle 1 will be described. FIG. 6 is a front view of the front portion of the vehicle 1 as viewed from the front of the body frame 21 in such a state that the body frame 21 leans to the left of the vehicle 1. FIG. 6 shows a state as seen through the front cover 221 that is indicated by dashed lines.

As shown in FIG. 2, in such a state that the vehicle 1 is standing upright, when looking at the vehicle 1 from the front of the body frame 21, the linkage 5 has a rectangular shape. As shown in FIG. 6, with the vehicle 1 leaning to the left, when looking at the vehicle 1 from the front of the body frame 21, the linkage 5 has a parallelogram shape. The deformation of the linkage 5 is associated with the leaning of the body frame 21 in the left-and-right direction of the vehicle 1. The operation of the linkage 5 means that the upper cross member 51, the lower cross member 52, the left side member 53 and the right side member 54 which define the linkage 5 turn relatively about turning axes which pass through the corresponding connecting portions A, C, E, G, H, I, such that the shape of the linkage 5 changes.

For example, as shown in FIG. 6, when the rider causes the vehicle 1 to lean to the left, the link support 212 leans to the left from the vertical direction. When the link support 212 leans, the upper cross member 51 turns counterclockwise as seen from the front of the vehicle 1 about the middle upper axis M that passes through the connecting portion C relative to the link support 212. Similarly, the lower cross member 52 turns counterclockwise as seen from the front of the vehicle 1 about the middle lower axis that passes through the connecting portion I relative to the link support 212. This causes the upper cross member 51 to move to the left relative to the lower cross member 52.

As the upper cross member 51 moves to the left, the upper cross member 51 turns counterclockwise as seen from the front of the vehicle 1 about the left upper axis which passes through the connecting portion A and the right upper axis which passes through the connecting portion E relative to the left side member 53 and the right side member 54, respectively. Similarly, the lower cross member 52 turns counterclockwise as seen from the front of the vehicle 1 about the left lower axis which passes through the connecting portion G and the right lower axis which passes through the connecting portion H relative to the left side member 53 and the right side member 54, respectively. This causes the left side member 53 and the right side member 54 to lean to the left from the vertical direction while allowing them to keep their postures that are parallel to the link support 212.

As this occurs, the lower cross member 52 moves to the left relative to the tie-rod 67. As the lower cross member 52 moves to the left, the shafts which are provided at the respective front portions of the middle joint 64, the left joint 65 and the right joint 66 turn relative to the tie-rod 67. This allows the tie-rod 67 to maintain a parallel posture to the upper cross member 51 and the lower cross member 52.

As the left side member 53 leans to the left, the left bracket 317 that is connected to the left side member 53 leans to the left. As the left bracket 317 leans to the left, the left shock absorber 33 which is connected to the left bracket 317 leans to the left. As the left shock absorber 33 leans to the left, the left front wheel 31 that is supported on the left shock absorber 33 leans to the left while maintaining a posture that is parallel to the link support 212.

As the right side member 54 leans to the left, the right bracket 327 that is connected to the right side member 54 leans to the left. As the right bracket 327 leans to the left, the right shock absorber 34 that is connected to the right bracket 327 leans to the left. As the right shock absorber 34 leans to the left, the right front wheel 32 that is supported on the right shock absorber 34 leans to the left while maintaining a posture that is parallel to the link support 212.

The description of the leaning operation of the left front wheel 31 and the right front wheel 32 is based on the vertical direction. However, when the vehicle 1 leans (when the linkage 5 is operated), the up-and-down direction of the body frame 21 does not coincide with the vertical up-and-down direction. In the event that the leaning operations are described based on the up-and-down direction of the body frame 21, when the linkage 5 is operated, the relative positions of the left front wheel 31 and the right front wheel 32 to the body frame 21 change. In other words, the linkage 5 changes the relative positions of the left front wheel 31 and the right front wheel 32 to the body frame 21 in the up-and-down direction of the body frame 21 to cause the body frame 21 to lean relative to the vertical direction.

When the rider causes the vehicle 1 to lean to the right, the elements lean to the right. Since the elements only move the other way around in relation to the left-and-right direction, the detailed description thereof will be omitted here.

Figure 7:
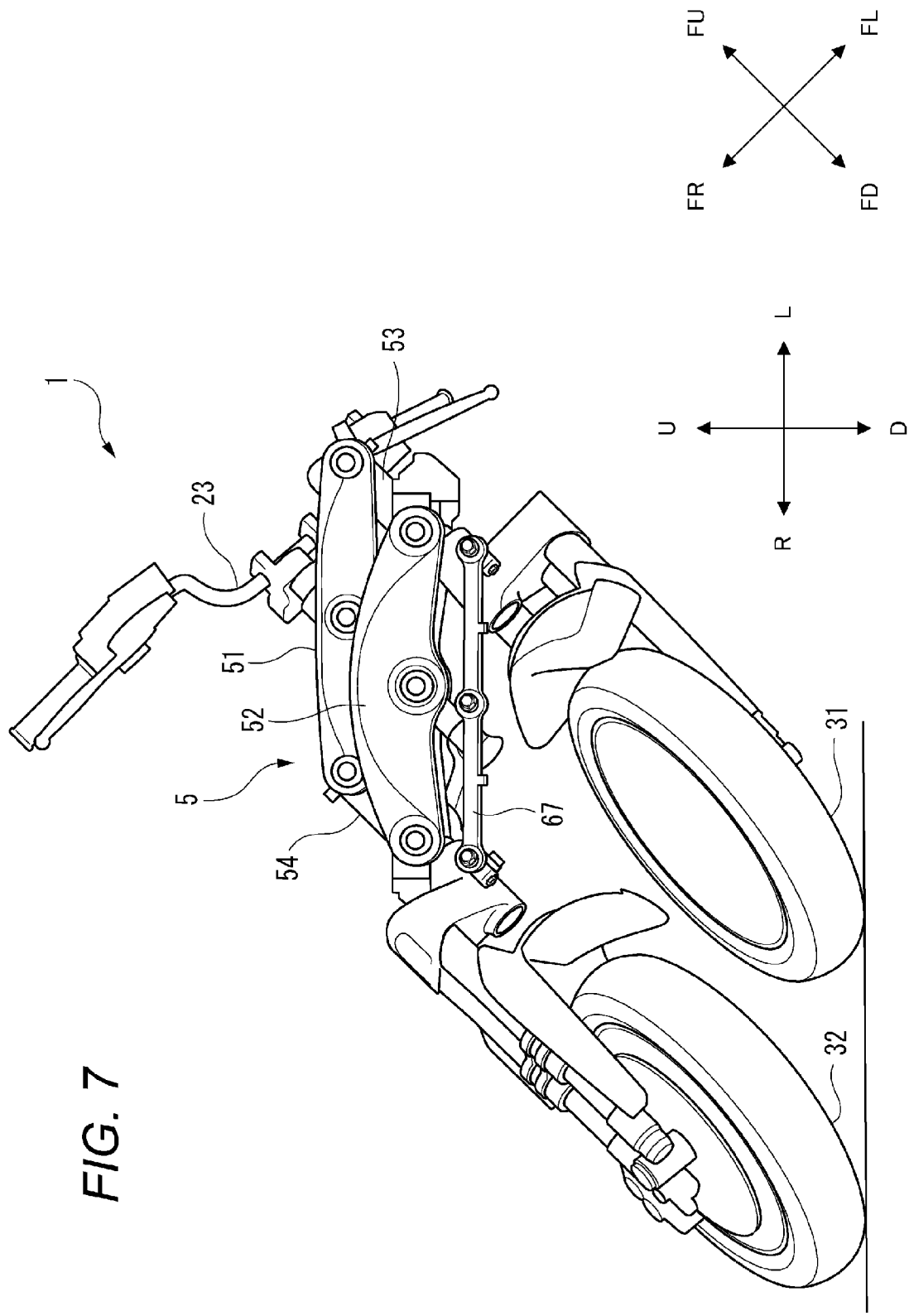
FIG. 7 is a front view showing the front portion of the vehicle shown in FIG. 1 when the vehicle is caused to lean while being steered.

FIG. 7 is a front view of the front portion of the vehicle with the vehicle 1 caused to lean and steered. FIG. 7 shows a state in which the vehicle 1 is steered or turned to the left while being caused to lean to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the linkage 5 exhibits the parallelogram shape, and the tie-rod 67 moves toward the left rear from its position taken when the body frame 21 is in the upright state.

As has been described above, the vehicle 1 according to the present preferred embodiment includes the body frame 21 that is able to lean to the right of the vehicle 1 when the vehicle 1 turns right and is able to lean to the left of the vehicle 1 when the vehicle 1 turns left, the right front wheel 32 and the left front wheel 31 that are aligned side by side in the left-and-right direction of the body frame 21; the linkage 5 that includes the upper cross member 51 (an example of a cross member) that turns about the middle upper axis M (an example of a link axis) that extends in the front-and-rear direction of the body frame 21, which supports the right front wheel 32 and the left front wheel 31 so as to be displaced relatively in relation to the up-and-down direction of the body frame 21 with the right front wheel 32 being supported so as to turn about the right center axis Y that extends in the up-and-down direction of the body frame 21 and the left front wheel 31 being supported so as to turn about the left center axis X that is parallel to the right center axis Y; and the steering force transmission 6 that is disposed between the right center axis Y and the left center axis X when seen from the front of the vehicle 1, which includes the handlebar 23 (an example of a steering force input) that is provided so as to turn about a central steering axis a (an example of a rear steering axis a) that is parallel to the right center axis Y and which transmits the steering force inputted into the handlebar 23 to the right front wheel 32 and the left front wheel 31.

Figure 8:
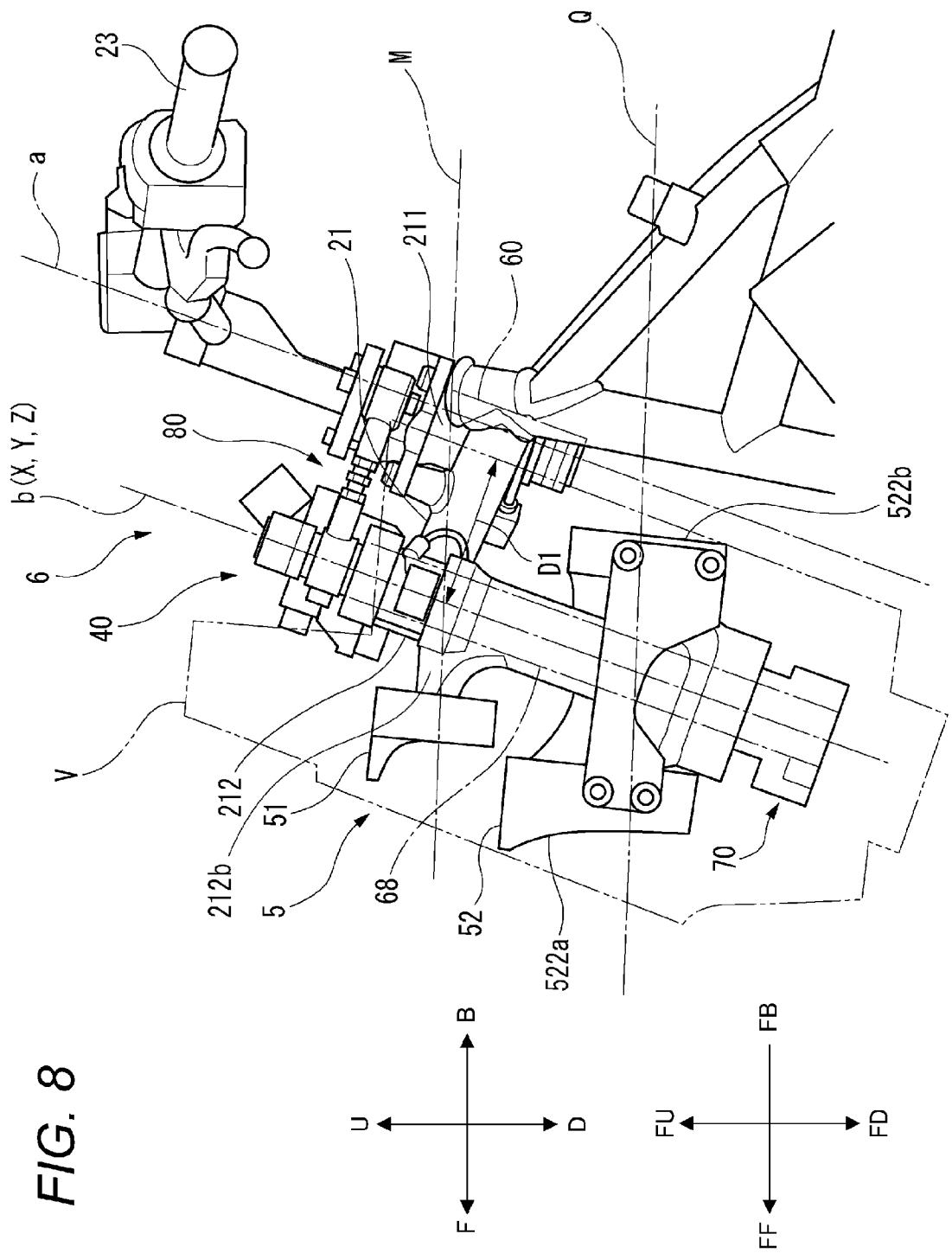
FIG. 8 is a side view showing a steering force transmission.

Next, the steering force transmission 6 will be described in detail. FIG. 8 is a side view showing the steering force transmission 6. As shown in FIG. 8, the steering force transmission 6 includes the handlebar 23 (the steering force input), the upstream side steering shaft 60, the connector 80, and the downstream side steering shaft 68. The steering force transmission 6 transmits a steering force that is inputted into the handlebar 23 to the right front wheel 32 and the left front wheel 31.

The upstream side steering shaft 60 is connected to the handlebar 23. The upstream side steering shaft 60 is supported on the headstock 211 (an example of a first support) so as to turn about a rear steering axis a that extends in the up-and-down direction of the body frame 21.

An upper portion of the upstream side steering shaft 60 projects above the headstock 211. The handlebar 23 is connected to the portion of the upstream side steering shaft 60 that projects above the headstock 211. The connector 80 is connected to the portion of the upstream side steering shaft 60 that projects above the headstock 211. The connector 80 is connected to the upstream side steering shaft 60 below the handlebar 23.

Figure 9:
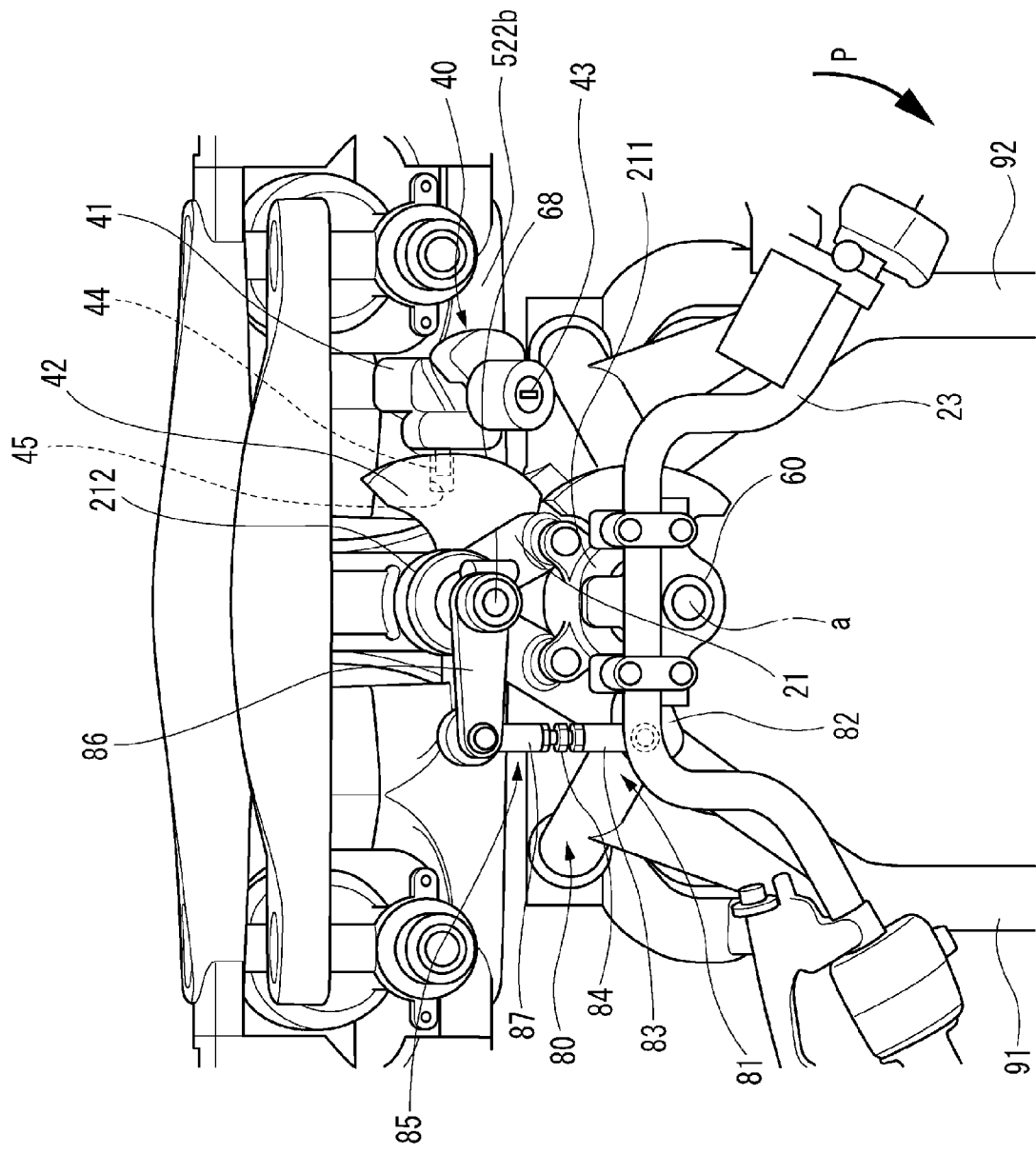
FIG. 9 is a plan view showing the steering force transmission.

FIG. 9 is a plan view showing the steering force transmission 6. As shown in FIG. 9, the connector 80 is connected to the upstream side steering shaft 60. The connector 80 is displaced as the upstream side steering shaft 60 turns.

In the present preferred embodiment, the connector 80 includes a rear element 81 that is fixed to the upstream side steering shaft 60, a front element 85 that is fixed to the downstream side steering shaft 68, and a bolt member 84 that connects the rear element 81 and the front element 85 together. In the present preferred embodiment, the bolt member 84 is provided on the left of the upstream side steering shaft 60 in the left-and-right direction of the body frame 21.

The rear element 81 includes a rear fixing portion 82 that is fixed to the upstream side steering shaft 60 and a rear thread portion 83 that is connected to the rear fixed portion 82 so as to turn about an axis that extends in the up-and-down direction of the body frame 21.

The front element 85 includes a front fixing portion 86 that is fixed to the downstream side steering shaft 68 and a front thread portion 87 that is connected to the front fixing portion 86 so as to turn about an axis that extends in the up-and-down direction of the body frame 21.

A hollow portion is provided on the rear thread portion 83 so as to open to the front, and a female thread portion is provided in an interior of the hollow portion. A hollow portion is also provided on the front thread portion 87 so as to open to the rear, and a female thread portion is provided in an interior of the hollow portion. The bolt member 84 includes male thread portions that are provided at a front portion and a rear portion thereof. The rear portion of the bolt member 84 engages in the rear thread portion 83 of the rear element 81. The front portion of the bolt member 84 engages in the front thread portion 87 of the front element 85. An engaging length of the bolt member 84 into the rear thread portion 83 and an engaging length of the bolt member 84 into the front thread portion 87 are adjusted to adjust an overall length of the connector 80 in the front-and-rear direction.

Returning to FIG. 8, the downstream side steering shaft 68 is provided downstream of the upstream side steering shaft 60 in a transmission path of a steering force that is transmitted from the handlebar 23 to the right front wheel 32 and the left front wheel 31. The downstream side steering shaft 68 is connected to the connector 80. The downstream side steering shaft 68 is able to turn about the front steering axis b that extends in the up-and-down direction of the body frame 21 as the connector 80 is displaced. In the present preferred embodiment, the rear steering axis a and the front steering axis b are parallel to each other.

The downstream side steering shaft 68 is supported on the link support 212 (an example of a second support) that is provided ahead of the headstock 211 in the front-and-rear direction of the body frame 21. As described in FIGS. 4 and 5, the downstream side steering shaft 68 displaces the tie-rod 67 in the left-and-right direction of the body frame 21 as the upstream side steering shaft 60 turns to turn the right front wheel 32 and the left front wheel 31. In the present preferred embodiment, the link support 212 supports the downstream side steering shaft 68 so as to turn and also supports the upper cross member 51 and the lower cross member 52 so as to turn.

The downstream side steering shaft 68 projects upwards and downwards from the link support 212. The connector 80 is connected to a portion of the downstream side steering shaft 68 that projects upwards from the link support 212. The middle transmission plate 61 is connected to a portion of the downstream side steering shaft 68 that projects downwards from the link support 212 to thereby be connected to the tie-rod 67.

Next, with reference to FIG. 9, the operation of the steering force transmission 6 will be described. When referred to in the following description, clockwise and counterclockwise represent turning directions as seen by the rider. When the rider turns the handlebar 23 clockwise as indicated by an arrow P, the upstream side steering shaft 60 that is fixed to the handlebar 23 turns clockwise. Then, the connector 80 that is fixed to the upstream side steering shaft 60 is displaced to the front.

To describe this in detail, when the rear fixing portion 82 of the rear element 81 of the connector 80 is displaced clockwise together with the upstream side steering shaft 60, the rear thread portion 83 is displaced to the front in the front-and-rear direction of the body frame 21. The bolt member 84 and the front thread portion 87 of the front element 85 are displaced to the front in the front-and-rear direction of the body frame 21 as the rear thread portion 83 is displaced.

When the front thread portion 87 of the front element 85 is displaced to the front, the front fixing portion 86 turns the downstream side steering shaft 68 clockwise. When the downstream side steering shaft 68 turns clockwise, the tie-rod 67 is displaced to the right in the left-and-right direction of the body frame 21.

As has been described above with reference to FIGS. 4 and 5, the tie-rod 67 turns the right front wheel 32 clockwise about the right center axis Y and turns the left front wheel 31 clockwise about the left center axis X via the middle transmission plate 61, the right transmission plate 63, the left transmission plate 62, the right bracket 327, the left bracket 317 and the like. This turns the right front wheel 32 and the left front wheel 31 to the right.

Next, a steering lock 40 will be described with reference to FIGS. 8 and 9. The steering lock 40 locks the right front wheel 32 and the left front wheel 31 so as not to turn. For example, the steering lock 40 is used to lock the right front wheel 32 and the left front wheel 31 so as not to turn for theft prevention. The steering lock 40 makes it impossible for the right front wheel 32 and the left front wheel 31 to turn by reducing the turning range of the right front wheel 32 and the left front wheel 31 to an angle that is smaller than an angle at which the right front wheel 32 and the left front wheel 31 are able to turn at normal times. In the present preferred embodiment, the steering lock 40 is preferably a so-called cylinder lock type steering lock 40.

As shown in FIGS. 8 and 9, the steering lock 40 includes a main switch 41 and a pin receiver 42. The main switch 41 is fixed to the vehicle body frame 21. The main switch 41 is provided ahead of the handlebar 23. The main switch 41 includes a key insertion port 43. The key insertion port 43 opens upwards and rearwards. The main switch 41 includes a pin 44 that is able to be displaced in the left-and-right direction. The pin 44 projects to the left from a left surface of the main switch 41. The pin 44 is able to take an advanced position where the pin 44 projects to the left and a withdrawal position where the pin 44 is disposed on the right of the advanced position according to the turning angle of a key inserted into the key insertion port 43.

The pin receiver 42 is fixed directly or indirectly to the downstream side steering shaft 68. The pin receiver 42 is fixed directly or indirectly to an upper portion of the downstream side steering shaft 68. When the downstream side steering shaft 68 turns, the pin receiver 42 also turns. In contrast with this, motion of the body frame 21 is unrelated to the motion of the tuning of the downstream side steering shaft 68 and does not turn. Namely, the main switch 41 and the pin receiver 42 are able to be displaced relative to each other.

The pin receiver 42 includes a pin receiving hole 45. The pin receiving hole 45 extends in the left-and-right direction. The pin receiving hole 45 opens to a right surface of the pin receiver 42. The pin receiving hole 45 is sized that the pin 44 of the main switch 41 is able to be inserted thereinto. In the present preferred embodiment, the pin receiving hole 45 is provided in the pin receiver 42 so that, with the handlebar 23 turned clockwise through a predetermined angle from a neutral position thereof, the opening of the pin receiver 42 faces the pin 44 in a squared manner.

In such a state that the steering lock 40 is kept in an inoperable state, the steering lock 40 enables the right front wheel 32 and the left front wheel 31 to be steered or turned. In such a state that the steering lock 40 is kept in an inoperable state, the pin 44 stays in the withdrawal position, and the pin 44 is not inserted into the pin receiving hole 45.

In such a state that the rider turns the handlebar 23 clockwise through the predetermined angle from the neutral position, when the rider turns the key inserted into the key insertion port 43 counterclockwise, for example, the steering lock 40 is put into an operable state. With the steering lock 40 kept in the operable state, the right front wheel 32 and the left front wheel 31 cannot be turned.

When the steering lock 40 is shifted from the inoperable state to the operable state, a cylinder mechanism, not shown, is activated, such that the pin 44 projects to the left to stay in the advanced position. Then, the pin 44 is inserted into the pin receiver 42, such that the main switch 41 and the pin receiver 42 cannot be displaced relative to each other. Even though the force attempting to turn the downstream side steering shaft 68 is exerted on the downstream side steering shaft 68, the pin 44 is brought into abutment with an inner surface of the pin receiving hole 45, such that the turning of the downstream side steering shaft 68 is prevented. In this way, the downstream side steering shaft 68 does not turn, and therefore, the tie-rod 67 that is connected to the downstream side steering shaft 68 and the right front wheel 32 and the left front wheel 31 cannot be displaced, and the right front wheel 32 and the left front wheel 31 are not turned. Since the downstream side steering shaft 68 does not turn, the connector 80 cannot be displaced, either, such that the turning of the upstream side steering shaft 60 and the handlebar 23 is prevented. In this way, the steering lock 40 includes the main switch 41 and the pin receiver 42 which are able to be displaced relative to each other and prevents the right front wheel 32 and the left front wheel 31 from being turned by preventing the main switch 41 from being displaced relative to the pin receiver 42.

The pin receiver 42 is provided directly on the downstream side steering shaft 68 or may be provided on a member that is displaced together with the downstream side steering shaft 68 when the downstream side steering shaft 68 turns. Where to provide the main switch 41 including the pin 44 is not limited to the body frame 21 as long as the relative displacement of the pin receiver 42 is able to be prevented, and thus, the main switch 41 should be provided on the member that is displaced together with the downstream side steering shaft 68 when the downstream side steering shaft 68 turns. In addition, the mechanism of the steering lock 40 is not limited to the combination of the pin 44 and the pin receiving hole 45 that prevents the relative displacement of the pin 44 thereto as described above as long as the relative displacement between the pin 44 and the pin receiving hole 45 is able to be prevented. Contrary to the configuration described above, the main switch 41 may be fixed to the downstream side steering shaft 68 and the pin receiver 42 may be fixed to the body frame 21.

Figure 10:
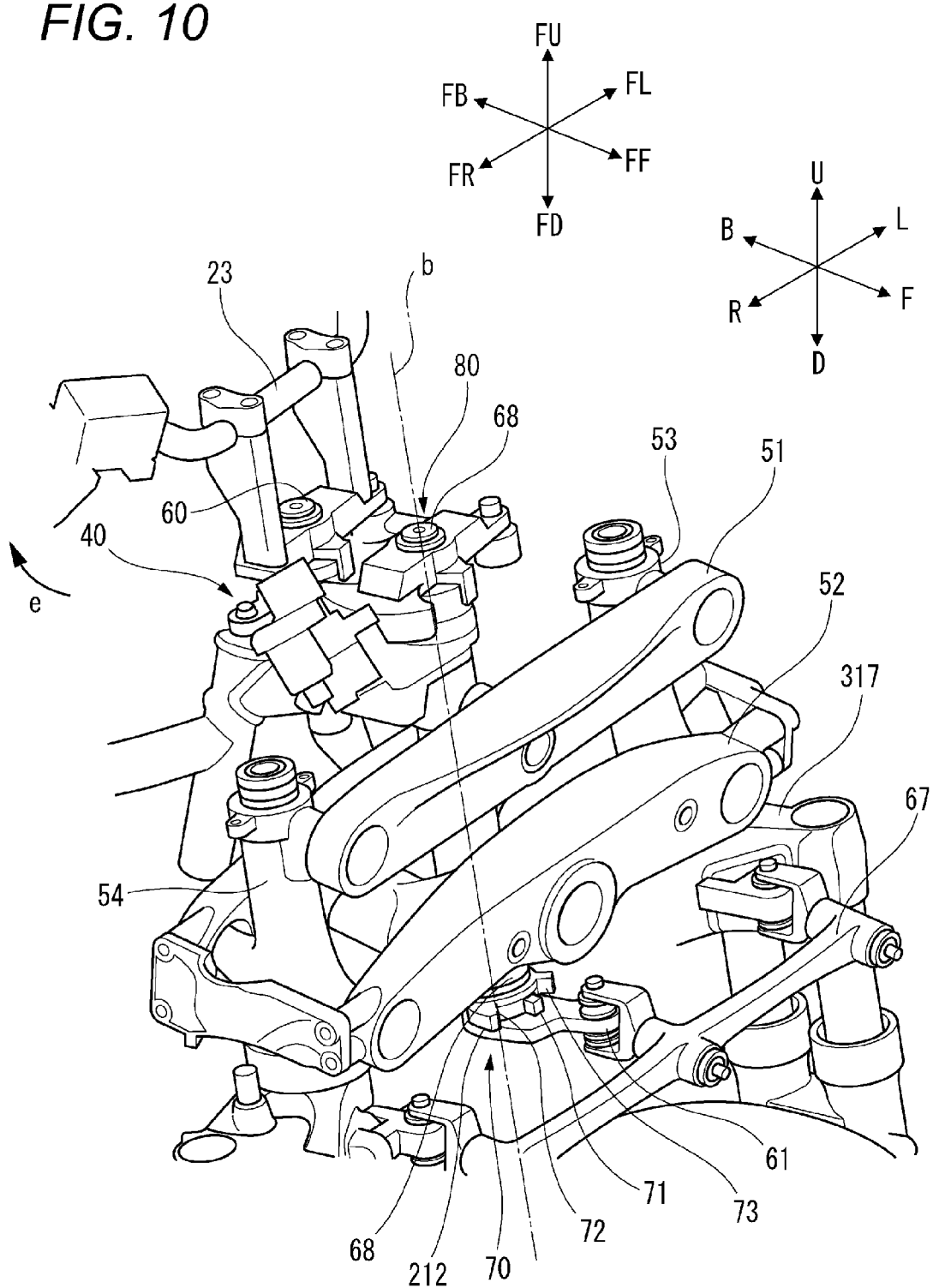
FIG. 10 is a perspective view showing the front portion of the vehicle.

Next, a steering stopper 70 will be described with reference to FIG. 10. FIG. 10 is a perspective view showing the front portion of the vehicle 1. As shown in FIG. 10, the steering stopper 70 is provided at a lower portion of the downstream side steering shaft 68. The steering stopper 70 restricts a maximum steering angle of the right front wheel 32 and the left front wheel 31. The maximum steering angle means an angle at which the right front wheel 32 and the left front wheel 31 cannot be turned to a greater angle than the angle even when the rider attempts to turn the right front wheel 32 and the left front wheel 31 further. The maximum steering angle means an angle that is set by a designer of the vehicle 1 with a view to avoiding interference of constituent members of the vehicle 1 that would be caused as the vehicle 1 is steered.

As shown in FIG. 10, the steering stopper 70 includes a projection 71 that is provided at the lower portion of the downstream side steering shaft 68 and a right abutment wall 72 and a left abutment wall 73 that are provided on the link support 212. The projection 71 is provided integrally on a lower end of the downstream side steering shaft 68. In the vehicle 1 that is not steered at all, the projection 71 projects to the front from the lower end of the downstream side steering shaft 68. The right abutment wall 72 is provided directly on the right of the projection 71 and the left abutment wall 71 is provided directly on the left of the projection 71. Since the downstream side steering shaft 68 is supported on the link support 212 so as to turn, the projection 71 is able to be displaced relative to the right abutment wall 72 and the left abutment wall 73.

In the event that the right front wheel 32 and the left front wheel 31 are turned through a steering angle that is smaller than the maximum steering angle, the downstream side steering shaft 68 turns relative to the link support 212 without the projection 71 being brought into abutment with the right abutment wall 72 and the left abutment wall 73.

In contrast to this, when the right front wheel 32 and the left front wheel 31 are turned rightwards to a rightward maximum steering angle, in case the rider attempts to turn the handlebar 23 clockwise as seen by the rider (a direction indicated by an arrow e in FIG. 10) to an angle exceeding the rightward maximum steering angle, the projection 71 attempts to turn about the front steering axis b via the upstream side steering shaft 60, the connector 80 and the downstream side steering shaft 68. However, the projection 71 is brought into abutment with the right abutment wall 72, such that the relative displacement of the projection 71 to the right abutment wall 72 is stopped. This prevents the displacement of the tie-rod 67, such that the right front wheel 32 and the left front wheel 31 are prevented from being turned to the right through a greater angle than the rightward maximum steering angle.

Similarly, when the right front wheel 32 and the left front wheel 31 are turned leftwards to a leftward maximum steering angle, in case the rider attempts to turn the handlebar 23 counterclockwise as seen by the rider to an angle exceeding the leftward maximum steering angle, the projection 71 is brought into abutment with the left abutment wall 73 to stop any further displacement of the projection 71 relative to the left abutment wall 73. This prevents the displacement of the tie-rod 67, such that the right front wheel 32 and the left front wheel 31 are prevented from being turned to the left through a greater angle than the leftward maximum steering angle.

In this way, the steering stopper 70 restricts the maximum steering angle of the right front wheel 32 and the left front wheel 31 by stopping the relative displacement of the projection 71 to the right abutment wall 72 and the left abutment wall 73 so as to prevent the right front wheel 32 and the left front wheel 31 from being steered or turned more than the maximum steering angle.

FIG. 8 is a side view of the vehicle 1 that is standing upright and which is not steered at all. In the vehicle 1 that is standing upright and which is not steered at all, a front steering axis b of the downstream side steering shaft 68 appears to overlap the left center axis X, the right center axis Y and the middle center axis Z.

In the present preferred embodiment, as shown in FIG. 8, when seen from the side of the vehicle 1, a distance (denoted by 0 in the illustrated example) between the downstream side steering shaft 68 (an example of a front shaft) and the right center axis Y is smaller than a distance D1 between the upstream side steering shaft 60 (an example of a rear shaft) and the right center axis Y. Namely, the downstream side steering shaft 68 is provided in a position that is located closer to the linkage 5 than the upstream side steering shaft 60. In the present preferred embodiment, when seen from the side of the vehicle 1 that is standing upright and which is not steered at all, the center axis of the downstream side steering shaft 68 is described as it appears to overlap the right center axis Y, however, the present invention is not limited to this configuration. For example, when seen from the side of the vehicle 1 that is standing upright and which is not steered at all, the center axis of the downstream side steering shaft 68 may deviate slightly to the front or rear of the right center axis Y.

In addition, at least a portion of the steering lock 40 that is mounted on the downstream side steering shaft 68 or the member that turns together with the downstream side steering shaft 68 and the member (the body frame 21) that is displaced relative thereto is provided in a position that overlaps a movable range V of the linkage 5 when seen from the side of the vehicle 1. The movable range V of the linkage 5 corresponds to a solid that is defined by an outer edge of an imaginary solid that is defined by the passage of the members (the upper cross member 51, the lower cross member 52, the left side member 53 and the right side member 54) that define the linkage 5 when the vehicle 1 is caused to lean from a right maximum banking angle to a left maximum banking angle. A non-movable range defined by a member such as the link support 212 that is not displaced when the vehicle 1 is caused to lean may be included inside the movable range V of the linkage 5.

In the vehicle 1 according to the preferred embodiment, the steering force transmission 6 that transmits the steering force inputted into the handlebar 23 (an example of a steering force input) to the right front wheel 32 and the left front wheel 31 includes the upstream side steering shaft 60 (the example of the rear shaft) into which the steering force is inputted from the handlebar 23, the downstream side steering shaft 68 (the example of the front shaft) and the connector 80 that connects together the upstream side steering shaft 60 and the downstream side steering shaft 68. Due to this, compared with the case where the steering force that is inputted into the handlebar is transmitted to the right front wheel 32 and the left front wheel 31 by a single steering shaft, the degree of freedom in designing the arrangement of the handlebar 23 is high. Due to this, the handlebar 23 is able to be disposed in a position or posture that enables a rider to use the handlebar 23 easily.

Further, the vehicle 1 is prevented from being enlarged in size for the following reason. The steering force transmission 6 includes the downstream side steering shaft 68 and the upstream side steering shaft 60. In a preferred embodiment of the present preferred embodiment, when seen from the side of the vehicle 1, the distance between the downstream side steering shaft 68 and the right center axis Y is smaller than the distance D1 between the upstream side steering shaft 60 and the right center axis Y. Namely, the upstream side steering shaft 60 is spaced farther away from the link the linkage 5 than the downstream side steering shaft 68. Due to this, it is considered that, in case the steering lock 40 is provided on the circumference of the upstream side steering shaft 60, the interference of the steering lock 40 with the linkage 5 is avoided easily, thus making it possible to prevent the enlargement in size of the vehicle 1.

In the event that the steering lock 40 is provided on the circumference of the upstream side steering shaft 60, however, in case the connector 80 is broken which connects together the upstream side steering shaft 60 and the downstream side steering shaft 68, even though the upstream side steering shaft 60 is locked, the downstream side steering shaft 68 is able to turn, leading to concerns that the locked state of the right front wheel 32 and the left front wheel 31 is released. Due to this, it is necessary that the strength of the connector 80 is enhanced so as not to be broken and that the connector 80 is protected from external access attempting gain access to the connector 80. The inventor of preferred embodiments of the present invention noticed that in case the strength of the connector 80 is enhanced in the way described above, the connector 80 has to be enlarged in size and an additional cover is necessary to protect the connector 80, as a result of which an enlargement in size of the vehicle 1 is required.

Then, the inventor of preferred embodiments of the present invention studied the challenge of providing the steering lock 40 on the circumference of the downstream side steering shaft 68. In case the steering lock 40 is disposed on the circumference of the downstream side steering shaft 68, even though the connector 80 is broken, the locked state of the right front wheel 32 and the left front wheel 31 is maintained. Due to this, the inventor considered that the vehicle 1 is able to be prevented from being enlarged in size since the necessity is obviated of enhancing the strength of the connector 80 or providing the additional cover to prevent the breakage of the connector 80.

Firstly, in case the steering lock 40 is attempted to be disposed on the left or right of the downstream side steering shaft 68 in relation to the left-and-right direction of the body frame 21, since the downstream side steering shaft 68 and the linkage 5 are disposed close to each other, the steering lock 40 easily interferes with the linkage 5, and hence, it becomes difficult to arrange the steering lock 40. In order to avoid the interference of the steering lock 40 with the linkage 5, the steering lock 40 has to be placed in a position that is spaced away from the linkage 5 in the left-and-right direction of the body frame 21, which is not realistic.

Then, it is considered that the steering lock 40 is provided ahead or behind the linkage 5 in relation to the front-and-rear direction of the body frame 21 to provide the steering lock 40 in a position where the interference thereof with the linkage 5 is avoided while preventing the enlargement in size of the vehicle 1. Compared with the vehicle in which the steering force transmission includes a single steering shaft, however, the vehicle 1 in which the steering force transmission 6 includes two shafts of the downstream side steering shaft 68 and the upstream side steering shaft 60 tends to be easily enlarged in size in the front-and-rear direction of the body frame 21. Due to this, in case the steering lock 40 is provided ahead or behind the linkage 5 in relation to the front-and-rear direction of the body frame 21, the size of the vehicle 1 is enlarged further in the front-and-rear direction.

Then, the inventor of preferred embodiments of the present invention considered that at least a portion of the steering lock 40 is provided in a position that overlaps the movable range V of the linkage 5 when seen from the side of the vehicle 1. The cross members 51, 52 of the linkage 5 turn, respectively, about the middle upper axis M and the middle lower axis Q (an example of a link axis) that extend in the front-and-rear direction of the body frame 21. Due to this, for example, in case at least a portion of the steering lock 40 is provided on the circumference of the middle upper axis M of the cross members 51, 52, it becomes difficult for the steering lock 40 to interfere with the linkage 5. The inventor discovered that the steering lock 40 is able to be disposed without interfering with the linkage 5 even in the area which overlaps the movable range V of the linkage 5 when seen from the side of the vehicle 1 as described above. In addition, by providing the steering lock 40, in the way described above, so that at least a portion of the steering lock 40 overlaps the movable range V of the linkage 5 when seen from the side of the vehicle 1, the vehicle 1 is prevented from being enlarged in size in the front-and-rear direction.

Figure 11:
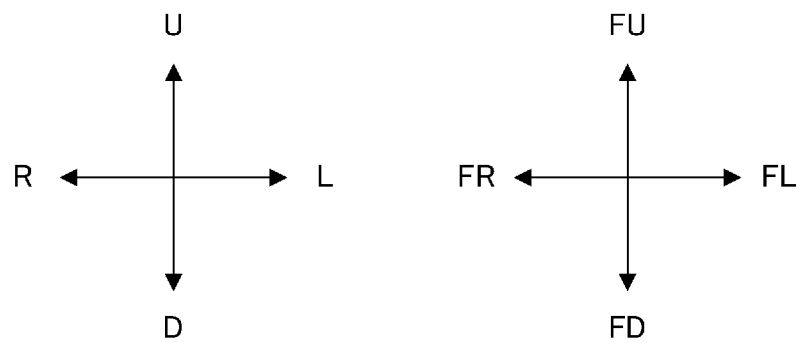
FIG. 11 is a front view showing the steering force transmission.
Figure 11:
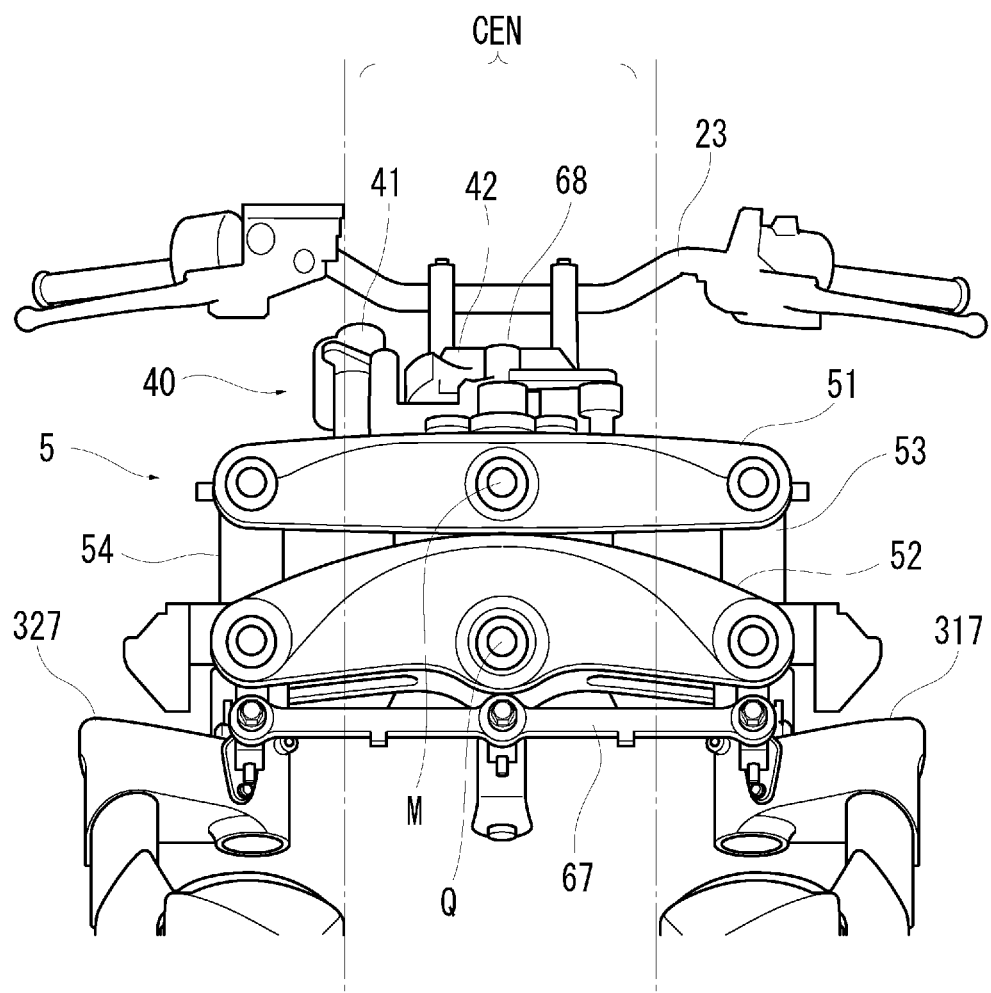

FIG. 11 is a front view of the steering force transmission 6. In the vehicle according to the preferred embodiment, as shown in FIGS. 9 and 11, when seen from the front of the vehicle 1 that is standing upright, at least a portion of the steering lock 40 is provided above or below the cross members 51, 52. In the illustrated example, at least a portion of the steering lock 40 is disposed above the upper cross member 51 and the lower cross member 52. When seen from the top of the vehicle 1, as shown in FIG. 9, at least a portion of the steering lock 40 overlaps the rear plate member 522b of the lower cross member 52. Different from preferred embodiments of the present invention, in the event that at least a portion of the steering lock projects to the left or right of the cross member when seen from the front of the vehicle that is standing upright, the vehicle tends to be enlarged in size in the left-and-right direction. According to the vehicle 1 described above, however, since the steering lock 40 is provided above or below the cross members 51, 52 when seen from the front of the vehicle 1 that is standing upright, it is difficult for the vehicle 1 to be enlarged in size in the left-and-right direction.

In the present preferred embodiment, as shown in FIG. 11, when the vehicle 1 is divided into three areas of a right portion, a central portion CEN, and a left portion in the left-and-right direction of the body frame 21 when seen from the front of the vehicle 1 that is standing upright, at least a portion of the steering lock 40 is disposed in the central portion CEN. In the illustrated example, at least the pin receiver 42 is disposed in the central portion CEN.

According to the vehicle 1 described above, since at least a portion of the steering lock 40 is disposed in the central portion CEN, it becomes difficult for the vehicle 1 to be enlarged in size in the left-and-right direction. The cross members 51, 52 of the linkage 5 turn, respectively, about the middle upper axis M and the middle lower axis Q that extend in the front-and-rear direction of the body frame 21. The middle upper axis M and the middle lower axis Q are disposed in the central portion CEN in the left-and-right direction of the body frame 21, and therefore, in case at least a portion of the steering lock 40 is disposed in the central portion CEN in the left-and-right direction of the body frame 21, it becomes difficult for the steering lock 40 to interfere with the linkage 5.

In the present preferred embodiment, the steering lock 40 includes the pin receiver 42 (an example of a first portion) that is mounted on the downstream side steering shaft 68 or the member that turns together with the downstream side steering shaft 68 and the main switch 41 (an example of a second portion) that is mounted on the member (the body frame 21) that is displaced relative to the downstream side steering shaft 68 or the member that turns together with the downstream side steering shaft 68. The pin receiver 42 and the main switch 41 are brought into abutment with each other to make it impossible for the pin receiver 42 to be displaced relative to the main switch 41, such that the right front wheel 32 and the left front wheel 31 are made impossible to turn. As shown in FIG. 9, the abutment (the pin 44 and the pin receiving hole 45) between the pin receiver 42 and the main switch 41 is provided on one side (the right) of the downstream side steering shaft 68 in the left-and-right direction of the body frame 21, and the connector 80 is provided on the other side (the left) of the downstream side steering shaft 68 in the left-and-right direction of the body frame 21.

According to the vehicle 1 configured as described above, the abutment between the pin receiver 42 and the main switch 41 is disposed on the right of the downstream side steering shaft 68, and the connector 80 is disposed on the left of the downstream side steering shaft 68 in relation to the left-and-right direction of the body frame 21. Consequently, it becomes difficult for the abutment between the pin receiver 42 and the main switch 41 to interfere with the connector 80.

In the present preferred embodiment, the steering lock 40 includes the pin receiver 42 (the example of the first portion) that is mounted on the downstream side steering shaft 68 or the member that turns together with the downstream side steering shaft 68 and the main switch 41 (the example of the second portion) that is mounted on the member (the body frame 21) that is displaced relative to the downstream side steering shaft 68 or the member that turns together with the downstream side steering shaft 68. The pin 44 that is operated by the actuator may be provided on one of the pin receiver 42 and the main switch 41, and the pin receiving hole 45 that receives the pin 44 therein may be provided on the other of the pin receiver 42 and the main switch 41. The main switch 41 may include the actuator that shifts the pin 44 from the advanced position to the withdrawal portion as the key turns. The actuator is operated so as to bring the pin 44 into abutment with the pin receiving hole 45 so as to make it impossible for the pin receiver 42 to be displaced relative to the main switch 41, such that the right front wheel 32 and the left front wheel 31 are made impossible to turn.

According to the vehicle 1 configured as described above, the pin 44 is able to be brought into abutment with the pin receiving hole 45 by the actuator, which obviates the necessity of disposing the steering lock 40 in a position where the rider is able to easily reach the steering lock 40 to operate it manually. Due to this, for example, a configuration may be used in which the key insertion port 43 is spaced away from the pin 44 and the actuator while the key insertion port 43 and the actuator are connected by an electric wire and the key insertion port 43 transmits to the actuator an electric signal that signals the actuation of the actuator as the key is turned. As this occurs, and different from the illustrated example, the pin 44 and the actuator may be provided in an interior of the vehicle 1 to which it is difficult to access from the exterior of the vehicle 1, thus enhancing the degree of freedom in the arrangement of the steering lock 40.

In the present preferred embodiment, as shown in FIG. 8, the front steering axis b and the rear steering axis a are parallel to each other. According to the vehicle 1 configured as described above, since the front steering axis b and the rear steering axis a are parallel, the necessity is obviated of using a complex construction to transmit a steering force from the rear steering axis a to the front steering axis b by changing the turning angle, thus making it possible to configure the connector 80 using the simple construction.

In the present preferred embodiment, as shown in FIG. 8, the steering stopper 70 that restricts the maximum steering angle of the right front wheel 32 and the left front wheel 31 is mounted on the downstream side steering shaft 68 or the member that turns together with the downstream side steering shaft 68 and the member that is displaced relative to the downstream side steering shaft 68 when the downstream side steering shaft 68 turns, and at least a portion of the steering stopper 70 is provided in the position that overlaps the movable range V of the linkage 5 when seen from the side of the vehicle 1.

High rigidity is also required of the steering stopper 70 and the members on which the steering stopper 70 is mounted as is required of the steering lock 40 and the members on which the steering lock 40 is mounted. High rigidity is required of the steering stopper 70 so as to handle an external force that is exerted on the right front wheel 32, the left front wheel 31 and the handlebar 23 in an attempt to increase further the steering angle of the right front wheel 32 and the left front wheel 31 in such a state that the right front wheel 32 and the left front wheel 31 are steered to the maximum steering angle. In addition, high rigidity is also required of the member on which the steering stopper 70 is mounted. Then, according to the vehicle 1 of the present preferred embodiment, the steering lock 40 is mounted on the downstream side steering shaft 68 or the member that turns together with the downstream side steering shaft 68 and the member that is displaced relative to the downstream side steering shaft 68, and both the members have a high rigidity. Since the steering stopper 70 is mounted on these members having a high rigidity, the supporting rigidity of the steering stopper 70 is enhanced.

In the present preferred embodiment, the downstream side steering shaft 68 on which the steering lock 40 is provided may be thicker than the upstream side steering shaft 60. According to the vehicle 1 configured as described above, the steering lock 40 is able to be supported with high rigidity by using the downstream side steering shaft 68 having the high rigidity.

In the present preferred embodiment, the linkage 5 includes the right side member 54 that supports the right front wheel 32 so as to turn about the right center axis Y that extends in the up-and-down direction of the body frame 21 and the left side member 53 that supports the left front wheel 31 so as to turn about the left steering axis Y that is parallel to the right center axis Y. The cross member 51, 52 includes the upper cross member 51 that supports the upper portion of the right side member 54 at the right end thereof so as to allow the upper portion to turn about the right upper axis that extends in the front-and-rear direction of the body frame 21, which supports the upper portion of the left side member 53 at the left end thereof so as to allow the upper portion to turn about the left upper axis that is parallel to the right upper axis and which is supported on the body frame 21 at the central portion thereof so as to turn about the middle upper axis M that is parallel to the right upper axis, and the lower cross member 52 that supports the lower portion of the right side member 54 at the right end thereof so as to allow the lower portion to turn about the right lower axis that extends in the front-and-rear direction of the body frame 21, which supports the lower portion of the left side member 53 at the left end thereof so as to allow the lower portion to turn about the left lower axis that is parallel to the right upper axis and which is supported on the body frame 21 at the central portion thereof so as to turn about the middle lower axis Q that is parallel to the right upper axis. As shown in FIG. 8, the downstream side steering shaft 68 on which the steering lock 40 is provided is longer than the distance between the middle upper axis M and the middle lower axis Q.

According to the vehicle 1 configured as described above, the steering lock 40 is provided at any location along the length of the long downstream side steering shaft 68. For example, the steering lock 40 is able to be provided at an upper end of the downstream side steering shaft 68 (above the upper cross member 51) as shown in the figure, or at a central portion of the downstream side steering shaft 68 in relation to an up-and-down direction thereof (for example, between the upper cross member 51 and the lower cross member 52), or at a lower end of the downstream side steering shaft (below the lower cross member 52). In this way, since the degree of freedom in selecting the location where to place the steering lock 40 is high, the steering lock 40 is able to be provided, for example, at a location where it is difficult for the steering lock 40 to interfere with the other members.

In the present preferred embodiment, as shown in FIG. 8, the downstream side steering shaft 68 on which the steering lock 40 is provided may be thicker than an upper end of the right side member 54 or an upper end of the left side member 53. According to the vehicle 1 configured as described above, it is easy to ensure the rigidity of the downstream side steering shaft 68.

In the present preferred embodiment, as shown in FIG. 8, the downstream side steering shaft 68 on which the steering lock 40 is provided may be longer than the right side member 54 or the left side member 53.

According to the vehicle 1 configured as described above, the steering lock 40 is provided at any location along the length of the long downstream side steering shaft 68. The degree of freedom in selecting the location where to place the steering lock 40 is enhanced. Since the degree of freedom in selecting the location where to place the steering lock 40 is high, for example, the steering lock 40 is able to be provided at a location where it becomes difficult for the steering lock 40 to interfere with the other members.

In the vehicle 1 according to the present preferred embodiment, as shown in FIGS. 2 and 8, the cross member includes the upper cross member 51 and the lower cross member 52 that is provided below the upper cross member 51, and the body frame 21 includes the upper support C that supports the upper cross member 51 so as to turn and the lower support I that supports the lower cross member 52 so as to turn. As shown in FIG. 2, the front shaft 68 penetrates the body frame 21 (the link support 212) so that the front shaft (the downstream side steering shaft 68) passes the upper support C and the lower support I when seen from the front of the vehicle 1.

According to the vehicle 1 configured as described above, a portion (the link support 212) of the body frame 21 where the upper support C and the lower support I are provided has an enhanced rigidity in order to support the upper cross member 51 and the lower cross member 52 with high rigidity. The downstream side steering shaft 68 penetrates the link support 212 (a portion of the body frame) whose rigidity is enhanced, and therefore, the vehicle 1 is compact in size while avoiding interference of the linkage 5 with the steering force transmission 6. In particular, in the event that the portion (the link support 212) of the body frame where the upper support C and the lower support I are provided includes the pipe-shaped member, the link support 212 is highly rigid and light in weight. In case the downstream side steering shaft 68 penetrates the interior of the pipe-shaped link support 212, the vehicle 1 is compact in size while avoiding interference of the linkage 5 with the steering force transmission 6.

In the vehicle 1 according to the present preferred embodiment, as shown in FIG. 8, the body frame 21 preferably includes the link support 212 that supports the cross member (the upper cross member 51 and the lower cross member 52) so as to turn, the lower cross member 52 includes the front cross element (the front plate member 522a) that is disposed ahead of the link support 212 and the rear cross element (the rear plate member 522b) that is disposed behind the link support 212, and the front steering axis b of the front shaft (the downstream side steering shaft 68) is disposed between the front end of the front plate element 522a and the rear end of the rear plate member 522b.

According to the vehicle 1 configured as described above, when the linkage 5 is operated, the front plate member 522a and the rear plate member 522b turn about the link axes (the middle upper axis M and the middle lower axis Q) that extend in the front-and-rear direction of the body frame 21. Consequently, even though the downstream side steering shaft 68 is provided between the front plate member 522a and the rear plate member 522b, the downstream side steering shaft 68 does not interfere with the front plate member 522a and the rear plate member 522b when the linkage 5 is operated. Thus, the vehicle 1 is compact in size while preventing 0 interference described above.

In the vehicle 1 according to the present preferred embodiment, as shown in FIGS. 8 and 9, the body frame 21 preferably includes the pipe-shaped link support 212 that supports the cross member (the upper cross member 51 and the lower cross member 52) so as to turn, the front shaft (the downstream side steering shaft 68) provided coaxially with the pipe-shaped link support 212, and at least a portion of the downstream side steering shaft 68 is inserted into the interior of the pipe-shaped link support 212.

According to the vehicle 1 configured as described above, the link support 212 that supports the upper cross member 51 and the lower cross member 52 so as to turn includes the pipe-shaped member, and therefore, the link support 212 is highly rigid and light in weight. At least a portion of the downstream side steering shaft 68 is inserted into the interior of the pipe-shaped link support 212, and therefore, the vehicle 1 is compact in size while the link support 212 is highly rigid and light in weight and avoiding interference of the linkage 5 with the steering force transmission 6.

Further, in the present preferred embodiment, as shown in FIG. 8, the front plate member 522a of the lower cross member 52 is supported at the front portion of the link support 212 so as to turn. The rear plate member 522b of the lower cross member 52 is supported at the rear portion of the link support 212 so as to turn. Since the front plate member 522a and the rear plate member 522b are supported by the single link support 212, compared with a case where a member that supports the front plate member 522a and a member that supports the rear plate member 522b are prepared separately, the number of parts is reduced.

In the present preferred embodiment, as shown in FIG. 2, when seen from the front of the vehicle 1 that is standing upright and which is not steered at all, the lower end of the lower cross member 52 is disposed above the upper end of the right front wheel 32 and the upper end of the left front wheel 31. In addition, as shown in FIG. 4, when seen from the top of the vehicle 1 that is standing upright and which is not steered at all along the front steering axis a, at least a portion of the right front wheel 32 and at least a portion of the left front wheel 31 overlap the lower cross member 52. These configurations provide a vehicle which is compact in the left-and-right direction.

As shown in FIG. 8, at least a portion of the rear cross element 522b of the lower cross member 52 is disposed between the front steering axis b and the rear steering axis a. The rear plate member 522b is disposed using the space defined between the front steering axis b and the rear steering axis a, and therefore, the vehicle 1 is compact in size.

In the present preferred embodiment, as shown in FIG. 9, the body frame 21 includes the right frame 92 and the left frame 91 that is provided on the left of the right frame 92, the link support 212 (an example of a front shaft support) that supports the downstream side steering shaft 68 so as to turn is supported by the right frame 92 and the left frame 91, and the headstock 211 (an example of a rear shaft support) that supports the upstream side steering shaft 60 so as to turn is provided on the right frame 92 and the left frame 91 behind the connecting portion that connects the right frame 92 and the left frame 91 with the link support 212 in the front-and-rear direction of the body frame 21.

According to the vehicle 1 configured as described above, the headstock 211 is supported by the right frame 92 and the left frame 91, and therefore, the headstock 211 is supported with high rigidity in the left-and-right direction. The right frame 92 and the left frame 91 preferably support the engine unit 25 as shown in FIG. 1. Particularly high rigidity is required of the portion of the body frame 21 which supports the engine unit 25. Then, it is preferred that the headstock 211 is supported using the right frame 92 and the left frame 91 whose rigidity is enhanced to support the engine unit 25.

Figure 12:
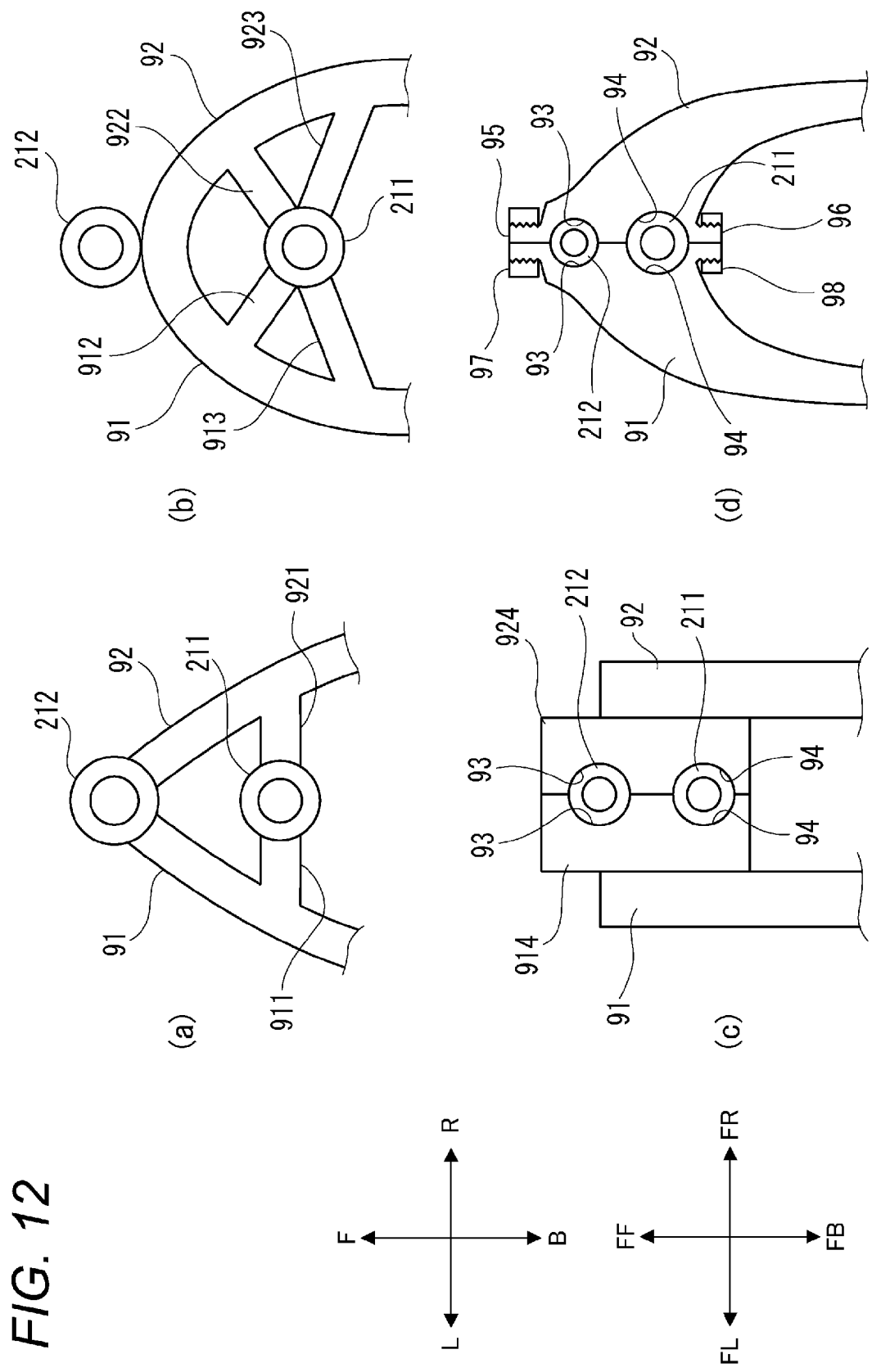
FIG. 12 is a plan view showing schematically a link support, a headstock, a right frame, and a left frame.

The right frame 92 and the left frame 91 are not limited to those shown in FIG. 9. FIG. 12 is a plan view showing schematically the link support 212, the headstock 211, the right frame 92, and the left frame 91. The right frame 92 and the left frame 91 may be configured as shown in FIG. 12.

In a configuration shown in FIG. 12(a), the link support 212 is supported by a front end of a right frame 92 and a front end of a left frame 91. A right rear portion of the link support 212 is supported by the front end of the right frame 92. A left rear portion of the link support 212 is supported by the front end of the left frame 91.

The headstock 211 is supported by a right middle frame 921 that extends to the left from the right frame 92 and a left middle frame 911 that extends to the right from the left frame 91 behind the link support 212 in the front-and-rear direction of the body frame 21. A right portion of the headstock 211 is supported by a left end of the right middle frame 921. A left portion of the headstock 211 is supported by a right portion of the left middle frame 911.

In a construction shown in FIG. 12(b), a right frame 92 and a left frame 91 are integrated into one unit at front ends thereof. The link support 212 is supported at a front end of the integral right frame 92 and left frame 91. A rear end of the link support 212 is supported at the front end of the integral right frame 92 and left frame 91.

The headstock 211 is supported, behind the link support 212, by a first right middle frame 922 that extends to the left from the right frame 92, a second right middle frame 923 that extends to the left from the right frame 92 behind the first right middle frame 922, a first left middle frame 912 that extends to the right from the left frame 91 and a second left middle frame 913 that extends to the right from the left frame 91 behind the first left middle frame 912. A right front portion of the headstock 211 is supported by the first right middle frame 922, and a right rear portion of the headstock 211 is supported by the second right middle frame 923. A left front portion of the headstock 211 is supported by the first left middle frame 912, and a left rear portion of the headstock 211 is supported by the second left middle frame 913.

In a construction shown in FIG. 12(c), a substantially rectangular parallelepiped right block body 924 is fixed to a left front portion of a right frame 92. A substantially rectangular parallelepiped left block body 914 is fixed to a right front portion of a left frame 91. The right block body 924 and the left block body 914 are connected together.

First recesses 93 and second recesses 94 that are disposed behind the first recesses 93 are provided on surfaces of the right block body 924 and the left block body 914 that face each other. The first recess 93 on the right block body 924 and the first recess 93 on the left block body 914 define a hole into which the link support 212 is fixedly inserted. The second recess 94 on the right block body 924 and the second recess 94 on the left block body 914 define a hole into which the headstock 211 is fixedly inserted. In this configuration, in place of the substantially rectangular parallelepiped block bodies, plate members may be used.

In a construction shown in FIG. 12(d), front tightening portions 95 that protrude to the front are provided individually at front ends of surfaces of front portions of a right frame 92 and a left frame 91 which face each other. Rear tightening portions 96 that protrude to the rear are provided individually at rear ends of the surfaces of front portions of the right frame 92 and the left frame 91 which face each other.

By matching the right frame 92 and the left frame 91 face to face together, a front end of the right frame 92 and a front end of the left frame 91 define a single front tightening portion 95, and a rear end of the right frame 92 and a rear end of the left frame 91 define a single rear tightening portion 96. A nut member 97 is tightened on to the front tightening portion 95, and a nut member 98 is tightened on to the rear tightening portion 96, such that the right frame 92 and the left frame 91 are fixed together strongly and rigidly.

The first recesses 93 and the second recesses 94 that are disposed behind the first recesses 93 are provided on the surfaces of the front portion of the right frame 92 and the front portion of the left frame 91 that face each other. The first recess 93 on the right frame 92 and the first recess 93 of the left frame 91 define the hole into which the link support 212 is fixedly inserted. The second recess 94 on the right frame 92 and the second recess 94 of the left frame 91 define the hole into which the headstock 211 is fixedly inserted.

By setting a diameter of the hole defined by the first recesses 93 to be slightly smaller than an outside diameter of the link support 212, the link support 212 is supported strongly and rigidly by the right frame 92 and the left frame 91 in a simple manner by tightening the front tightening portion 95 and the rear tightening portion 96 by the nut members 97, 98, respectively. Alternatively, by setting a diameter of the hole that is defined by the second recesses 94 to be slightly smaller than an outside diameter of the headstock 211, the headstock 211 is supported strongly and rigidly in a simple manner by the right frame 92 and the left frame 91 by tightening the front tightening portion 95 and the rear tightening portion 96 by the nut members 97, 98, respectively.

In the present preferred embodiment, as shown in FIG. 8, the body frame 21 includes the link support 212 (the example of the front support) including the pivotably support 212b that supports the cross members 51, 52 so as to turn, and the downstream side steering shaft 68 penetrates the link support 212. In the present preferred embodiment, the pivotable support 212b is a shaft that projects to the front or rear from the link support 212. This pivotable support 212b is integral with the link support 212. The plate member 512 of the upper cross member 51 is supported by the pivotable support 212b that project to the front from the link support 212 so as to turn. The front plate member 522a of the lower cross member 52 is supported so as to turn by the pivotable support 212b that projects to the front from the link support 212, and the rear plate member 522b is supported so as to turn by the pivotable support 212b that projects to the rear from the link support 212.

According to the vehicle 1 configured as described above, the following advantageous effect is achieved. Since the link support 212 supports both the cross members 51, 52 and the downstream side steering shaft 68 whose turning axes differ from each other, the two members are supported by a single member, thus making it possible to decrease the number of parts. This prevents the enlargement in the size of the vehicle 1.

According to the vehicle 1 configured as described above, the following advantageous effect is achieved. Since high rigidity is required of the member to which the upper cross member 51 and the lower cross member 52 are attached, the rigidity of the member is high. In order to ensure high rigidity with a small amount of material, it is desirable to use a cylindrical shape, for example. Then, in the vehicle 1 according to the present preferred embodiment, the downstream side steering shaft 68 is inserted through the interior of the member that supports the upper cross member 51 and the lower cross member 52, and therefore, the efficient use of space is enhanced. In addition, the member that supports the upper cross member 51 and the lower cross member 52 and the member that supports the downstream side steering shaft 68 so as to turn are the same, and therefore, the number of parts is reduced.

Figure 13:
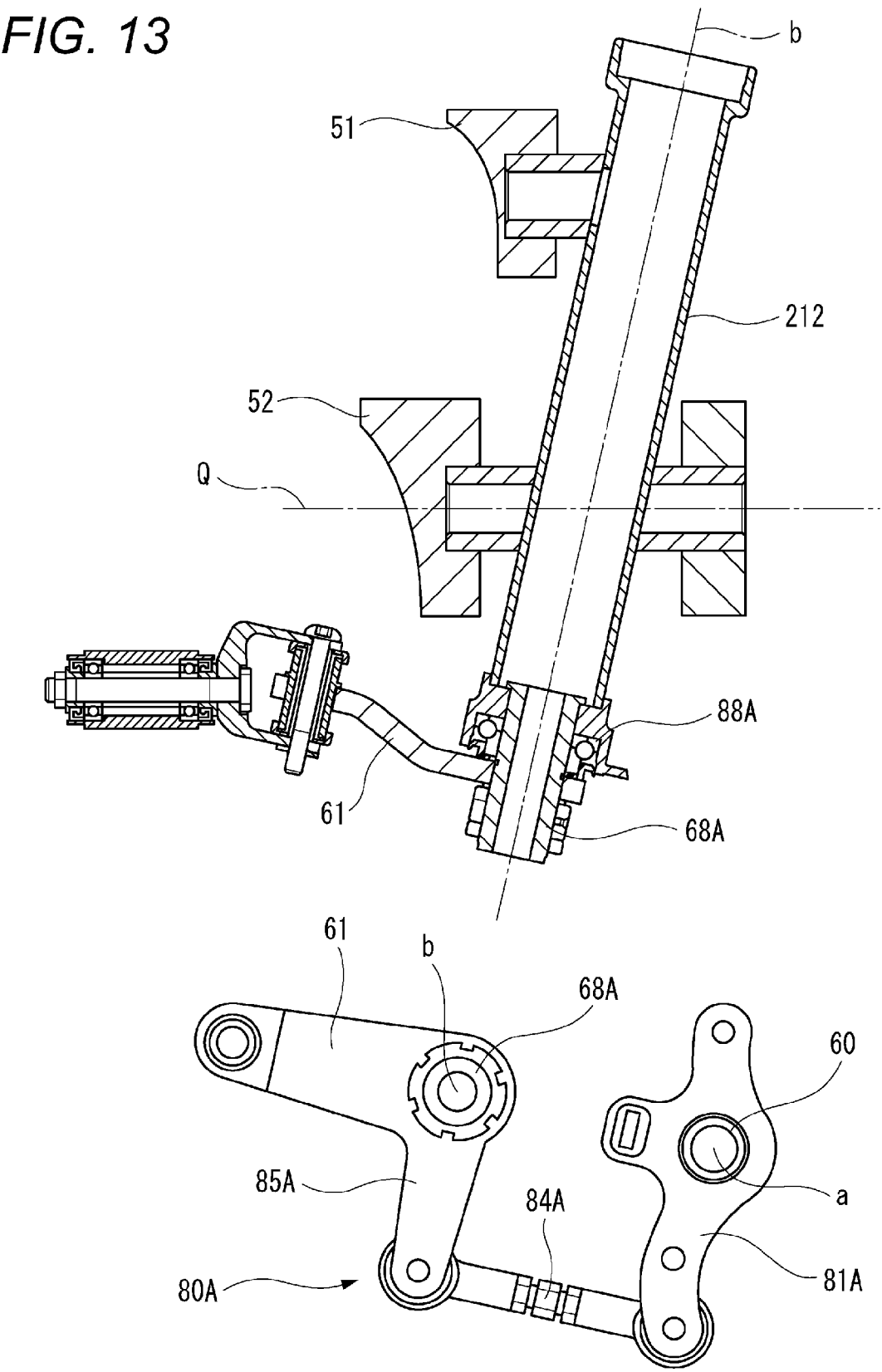
FIG. 13 is a side view showing a link support and a downstream side steering shaft according to a first modified referred embodiment of the present invention.

In the present preferred embodiment, while the downstream side steering shaft 68 is described as penetrating the cylindrical link support 212, the present invention is not limited thereto. FIG. 13 is a side view showing a link support 212 and a downstream side steering shaft 68 according to a first modified preferred embodiment of the present invention. As shown in FIG. 13, a downstream side steering shaft 68A is provided coaxially with a pipe-shaped link support 212 at a lower portion of the link support 212. The downstream side steering shaft 68A is supported by the link support 212 so as to turn. An outer circumferential surface of the downstream side steering shaft 68A is supported on an inner circumferential surface of a lower end of the pipe-shaped link support 212 via a bearing 88A. A front element 85A of a connector 80A is fixed to the downstream side steering shaft 68A so as not to turn. The front element 85A is integral with the middle transmission plate 61. A rear element 81A of the connector 80A is fixed to a lower end of the upstream side steering shaft 60 so as not to turn. This rear element 81A is connected to the front element 85A via a bolt member 84A.

Figure 14:
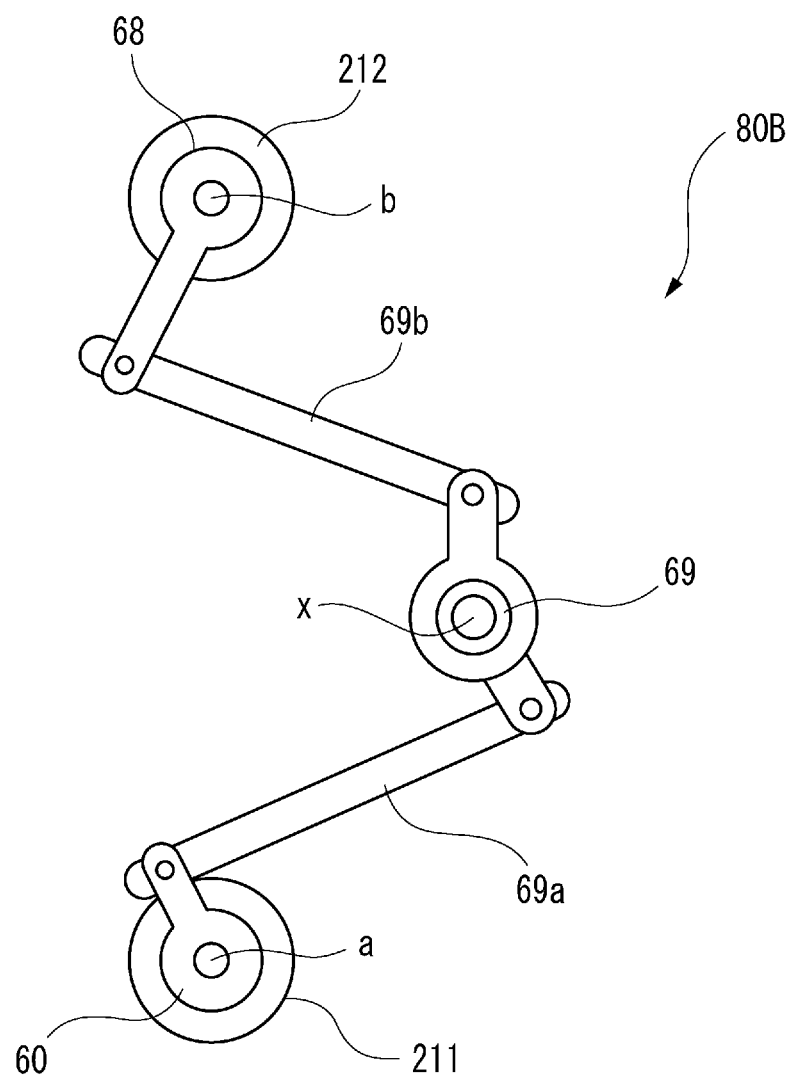
FIG. 14 is a schematic top view of a connector of a vehicle according to a second modified preferred embodiment of the present invention.

FIG. 14 is a schematic top view of a connector 80B of a vehicle 1 according to a second modified preferred embodiment of the present invention. As shown in FIG. 14, at least one middle shaft 69 is provided between the downstream side steering shaft 68 and the upstream side steering shaft 60. The connector 80B is preferably a link that is connected to the downstream side steering shaft 68 or the upstream side connecting shaft 60 via a turning axis x that is different from the front steering axis b and the rear steering axis a so as to turn and which is displaced as the upstream side steering shaft 60 turns to turn the downstream side steering shaft 68. The connector 80B shown includes the middle shaft 69, a first link member 69a and a second link member 69b.

The turning motion of the upstream side steering shaft 60 is transmitted to the middle shaft 69 via the first link member 69a. The turning motion of the middle shaft 69 is transmitted to the downstream side steering shaft 68 via the second link member 69b. In this way, the steering force transmitted to the upstream side steering shaft 60 is transmitted to the downstream side steering shaft 68 via the middle shaft 69.

In this way, the connector 80B transmits the turn motion of the upstream side steering shaft 60 to the downstream side steering shaft 68 by the one or more shafts. According to the vehicle 1 of the second modified preferred embodiment configured in the way described above, the connector 80B is easily configured and the degree of freedom in designing the steering force transmission 6 is high, and therefore, the usability of the handlebar 23 by the rider is enhanced further.

Figure 15:
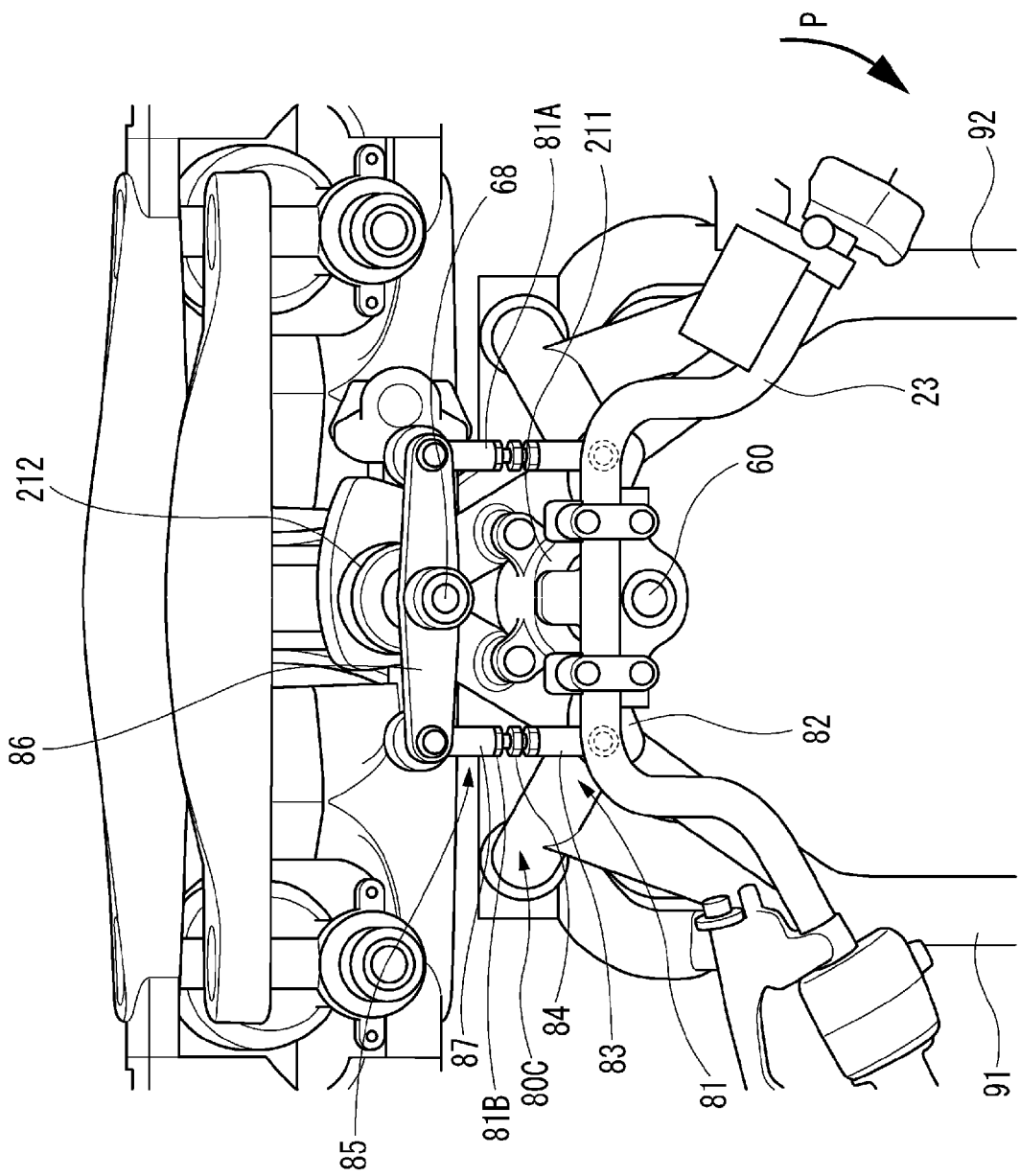
FIG. 15 is a schematic top view of a connector of a vehicle according to a third modified preferred embodiment of the present invention.

FIG. 15 is a schematic top view of a connector 80C of a vehicle according to a third modified preferred embodiment of the present invention. As shown in FIG. 15, the connector 80C includes a right element 81A that is provided on the right of the downstream side steering shaft 68 in relation to the left-and-right direction of the body frame 21 so as to connect together the downstream side steering shaft 68 and the upstream side steering shaft 60 and a left element 81B that is provided on the left of the downstream side steering shaft 68 in relation to the left-and-right direction of the body frame 21 so as to connect together the downstream side steering shaft 68 and the upstream side steering shaft 60.

According to the vehicle of the present preferred embodiment, compared with a case where the connector 80 includes a single element to connect together the downstream side steering shaft 68 and the upstream side connecting shaft 60, the rigidity of the connector 80C is easily enhanced.

As the connectors 80, 80A, 80B, 80C, a link construction, a construction using a pillow ball, a rolling bearing or a sliding bearing at an end of the link construction or a construction that uses a gear, a chain, a belt, a worm gear or a propeller shaft may be used to transmit the turning motion of the upstream side steering shaft 60 to the downstream side steering shaft 68. Alternatively, as in the preferred embodiments described above, a construction having the length adjusting function may be used as the connectors 80, 80A, 80B, 80C.

Figure 16:
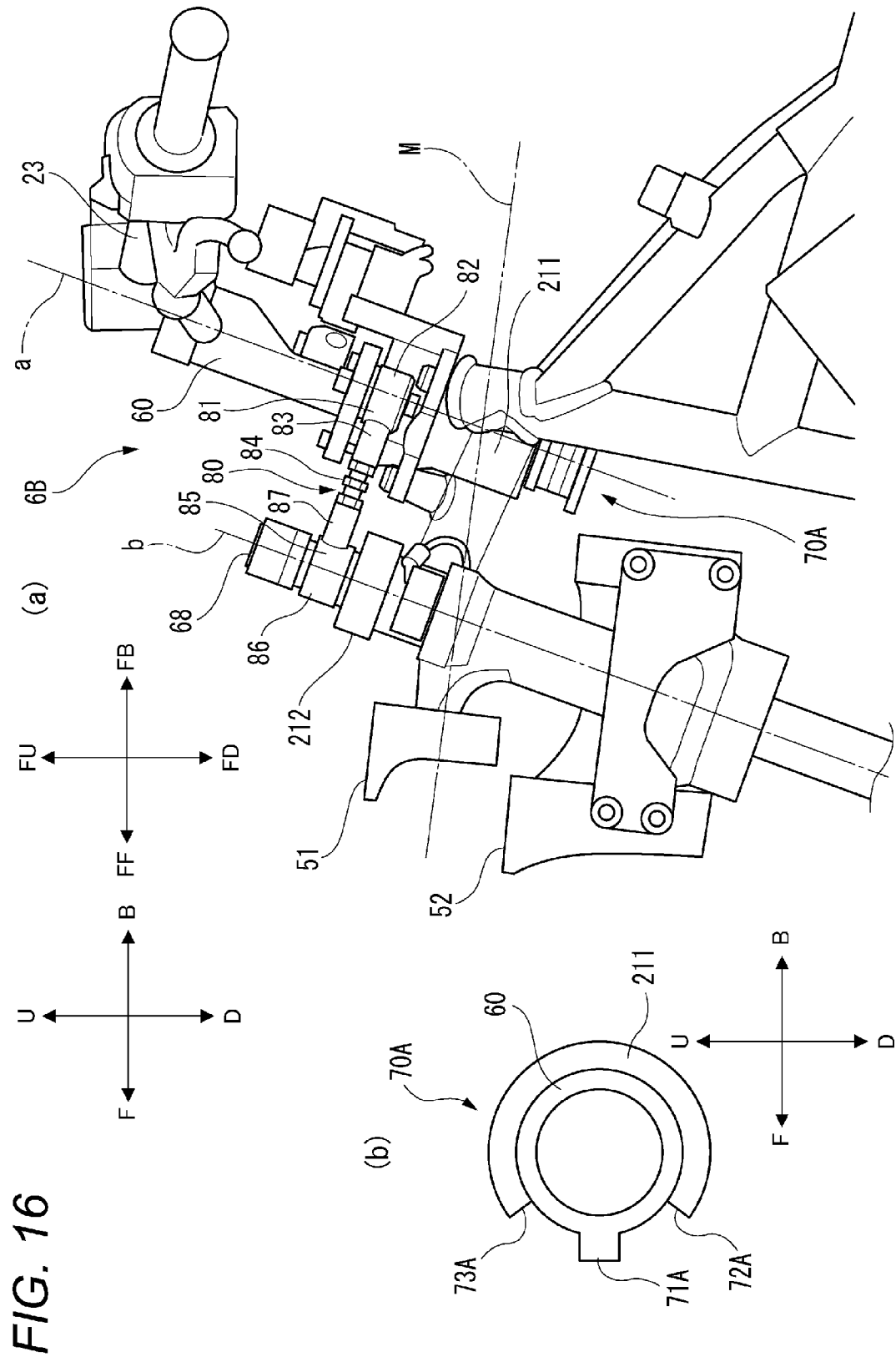
FIG. 16 is a top view of a steering force transmission of a vehicle according to a fourth modified preferred embodiment of the present invention.

FIGS. 16(a) and 16(b) are views showing a steering force transmission 6B of a vehicle according to a fourth modified preferred embodiment of the present invention. FIG. 16(a) is a side view, and FIG. 16(b) is a bottom view of the upstream side steering shaft 60. As shown in FIGS. 16(a) and 16(b), a steering stopper 70A that restricts the maximum steering angle of the right front wheel 32 and the left front wheel 31 is mounted on the upstream side steering shaft 60 or the member that turns together with the upstream side steering shaft 60 and the member (for example, the body frame 21) that is displaced relative to the upstream side steering shaft 60 when the upstream side steering shaft 60 turns. In the illustrated example, a projection 71A is provided at a lower end of the upstream side steering shaft 60. The projection 71A projects radially outwards from the upstream side steering shaft 60. A right abutment 72A and a left abutment 73A are provided at a lower end of the headstock 211 that supports the upstream side steering shaft 60 so as to turn. The projection 71A is brought into abutment with the right abutment 72A when the right front wheel 32 and the left front wheel 31 are steered to the right to a rightward maximum steering angle. The projection 71A is brought into abutment with the left abutment 73A when the right front wheel 32 and the left front wheel 31 are steered to the left to a leftward maximum steering angle. The steering stopper 70A prevents the right front wheel 32 and the left front wheel 31 from being steered through an angle that exceeds the maximum steering angle by using the configuration described above. According to the vehicle of the present preferred embodiment, compared with the preferred embodiments described above, the steering stopper 70A is easily provided in a position that is spaced farther away from the linkage 5 so as to make it difficult for the steering stopper 70A to interfere with the linkage 5, and therefore, it becomes difficult for the vehicle to be enlarged in size.

In the present preferred embodiment, the left shock absorber 33 and the right shock absorber 34 each include the pair of telescopic mechanisms. However, depending upon the specification of the vehicle 1, the number of telescopic mechanisms that the left shock absorber 33 and the right shock absorber 34 include individually may be one.

In the present preferred embodiment, in the left shock absorber 33, the left outer tube is described as being disposed above the left inner tube and the left front wheel 31 is described as being supported rotatably at the lower portion of the left inner tube, and in the right shock absorber 34, the right outer tube is described as being disposed above the right inner tube and the right front wheel 32 is described as being supported rotatably at the lower portion of the right inner tube, however, the present invention is not limited to this configuration. In the left shock absorber, the left inner tube may be disposed above the left outer tube and the left front wheel may be supported rotatably at the lower portion of the left outer tube, and in the right shock absorber, the right inner tube may be disposed above the right outer tube and the right front wheel may be supported rotatably at the lower portion of the right outer tube.

In the above preferred embodiments, while the left shock absorber 33 is described as being positioned on the left side of the left front wheel 31, and the right shock absorber 34 is described as being positioned on the right side of the right front wheel 32, the present invention is not limited thereto. The left shock absorber 33 may be disposed on the right of the left front wheel 31, and the right shock absorber 34 may be disposed on the left of the right front wheel 32.

In the above preferred embodiments, while the engine unit 25 is described as supporting the rear wheel 4 so as to rotate, the present invention is not limited thereto. The engine unit and the rear wheel may be both supported on the body frame so as to rotate.

In the above preferred embodiments, the vehicle 1 includes the single rear wheel 4. However, the vehicle 1 may include a plurality of rear wheels.

In the preferred embodiments described above, the center of the rear wheel 4 in the left-and-right direction of the body frame 21 coincides with the center of the space defined between the left front wheel 31 and the right front wheel 32 in the left-and-right direction of the body frame 21. Although the configuration described above is preferred, the center of the rear wheel 4 in the left-and-right direction of the body frame 21 does not have to coincide with the center of the space defined between the left front wheel 31 and the right front wheel 32 in the left-and-right direction of the body frame 21.

In the preferred embodiments described above, the linkage 5 includes the upper cross member 51 and the lower cross member 52. However, the linkage 5 may include a cross member other than the upper cross member 51 and the lower cross member 52. The "upper cross member" and the "lower cross member" are merely so called based on their relative positions in relation to the up-and-down direction. The upper cross member does not mean an uppermost cross member in the linkage 5. The upper cross member means a cross member that is located above another cross member that is located therebelow. The lower cross member does not mean a lowermost cross member in the linkage 5. The lower cross member means a cross member that is located below another cross member that is located thereabove. At least one of the upper cross member 51 and the lower cross member 52 may include two portions such as a right cross member and a left cross member. In this way, the upper cross member 51 and the lower cross member 52 may include a plurality of cross members as long as they maintain the link function.

In the preferred embodiments described above, the linkage 5 preferably includes the parallel four joint link system. However, the linkage 5 may use a double wishbone configuration.

When used in this description, the word "parallel" means that it also includes two straight lines which do not intersect each other as members while they are inclined at an angle falling within the range of about ±40 degrees. When used in this description to describe a direction or a member, the expression reading "something extends along a certain direction or member" means that it includes a case where something inclines at an angle falling within the range of about ±40 degrees relative to the certain direction or member. When used in this description, the expression reading "something extends in a direction" means that it includes a case where something extends in the direction while being inclined at an angle falling within the range of about ±40 degrees relative to the direction.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

The present invention can be embodied in many different forms. This description should be understood to provide preferred embodiments of the present invention. The preferred embodiment that are at least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics that are described commonly in various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this description or the prosecution of this patent application. Those preferred embodiments should be construed as non-exclusive. For example, in this description, the terms "preferable or preferably" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame that is able to lean to a right of the vehicle when the vehicle turns right and is able to lean to a left of the vehicle when the vehicle turns left;

a right front wheel and a left front wheel that are aligned side by side in a left-and-right direction of the body frame;
a linkage that includes a cross member that turns about a link axis that extends in a front-and-rear direction of the body frame relative to the body frame, supports the right front wheel and the left front wheel so as to be displaced relatively in an up-and-down direction of the body frame, and supports the right front wheel so as to turn about a right steering axis that extends in the up-and-down direction of the body frame and supports the left front wheel so as to turn about a left steering axis that is parallel to the right steering axis;
a steering force transmission that includes a steering force input that is disposed between the right steering axis and the left steering axis when seen from a front of the vehicle, is provided so as to turn about a middle steering axis that is parallel to the right steering axis, and transmits a steering force that is inputted to the steering force input to the right front wheel and the left front wheel; and
a steering lock that makes it impossible for the right front wheel and the left front wheel to be steered; wherein
the steering force transmission includes:
   a rear shaft into which a steering force is inputted from the steering force input and which is able to turn about a rear axis;
   a front shaft that is disposed ahead of the rear shaft in relation to the front-and-rear direction of the body frame and which is able to turn about a front axis; and
   a connector that transmits a turning motion of the rear shaft to the front shaft;
a distance between the front shaft and the right steering axis is smaller than a distance between the rear shaft and the right steering axis when seen from a side of the vehicle; and
the front shaft or a member that turns together with the front shaft and at least a portion of the steering lock that is mounted on a member that is displaced relative to the front shaft or the member are provided in a position that overlaps a movable range of the linkage when seen from the side of the vehicle.

2. The vehicle according to claim 1, wherein, when seen from the front of the vehicle that is standing upright, at least a portion of the steering lock is provided above or below the cross member.

3. The vehicle according to claim 1, wherein, when the vehicle is divided into three areas of a right portion, a central portion, and a left portion in the left-and-right direction of the body frame when seen from the front of the vehicle that is standing upright, at least a portion of the steering lock is disposed in the central portion.

4. The vehicle according to claim 1, wherein the connector includes a link that is connected to the front shaft or the rear shaft via a turning axis that is different from the front axis or the rear axis so as to turn and which is displaced as the rear shaft turns to turn the front shaft.

5. The vehicle according to claim 1, wherein the connector includes a right connector that is provided on a right of the front shaft in relation to the left-and-right direction of the body frame to connect the front shaft and the rear shaft together, and a left connector that is provided on a left of the front shaft in relation to the left-and-right direction of the body frame to connect the front shaft and the rear shaft together.

6. The vehicle according to claim 1, wherein the steering lock includes:
   a first portion that is attached to the front shaft or a member that turns together with the front shaft; and
   a second portion that is attached to a member that is displaced relative to the front shaft or the member that turns together with the front shaft;
   the first portion and the second portion are brought into abutment with each other so as to make it impossible for the first portion and the second portion to be displaced relatively to make it impossible for the right front wheel and the left front wheel to turn; and
   an abutment between the first portion and the second portion is provided on one side of the front shaft in the left-and-right direction of the body frame, and the connector is provided on the other side of the front shaft in the left-and-right direction of the body frame.

7. The vehicle according to claim 1, wherein the steering lock includes:
   a first portion that is attached to the front shaft or a member that turns together with the front shaft; and
   a second portion that is attached to a member that is displaced relative to the front shaft or the member that turns together with the front shaft;
   a pin that is operated by an actuator is provided on one of the first portion and the second portion;
   a pin receiver that receives the pin is provided on the other of the first portion and the second portion; and
   the actuator is operated to bring the pin into abutment with the pin receiver so as to make it impossible for the first portion and the second portion to turn relatively to make it impossible for the right front wheel and the left front wheel to turn.

8. The vehicle according to claim 1, wherein the front axis and the rear axis are parallel to each other.

9. The vehicle according to claim 1, further comprising:
   a steering stopper that restricts a maximum steering angle of the right front wheel and the left front wheel mounted on the front shaft or the member that turns together with the front shaft and a member that is displaced relative to the front shaft when the front shaft turns; wherein
   at least a portion of the steering stopper is provided in a position that overlaps a movable range of the linkage when seen from the side of the vehicle.

10. The vehicle according to claim 1, further comprising a steering stopper that restricts a maximum steering angle of the right front wheel and the left front wheel mounted on the rear shaft or a member that turns together with the rear shaft and a member that is displaced relative to the rear shaft when the rear shaft turns.

11. The vehicle according to claim 1, wherein the front shaft on which the steering lock is provided is thicker than the rear shaft.

12. The vehicle according to claim 1, wherein the linkage includes:
   a right side member that supports the right front wheel so as to turn about a right steering axis that extends in an up-and-down direction of the body frame; and
   a left side member that supports the left front wheel so as to turn about a left steering axis that is parallel to the right steering axis; wherein
   the cross member includes:
      an upper cross member that supports an upper portion of the right side member at a right end thereof so as to allow the upper portion to turn about a right upper axis that extends in a front-and-rear direction of the body frame, supports an upper portion of the left side member at a left end thereof so as to allow the upper portion to turn about a left upper axis that is parallel to the right upper axis, and which is supported on the body frame at a middle portion thereof so as to turn about a middle upper axis that is parallel to the right upper axis; and a lower cross member that supports a lower portion of the right side member at a right end thereof so as to allow the lower portion to turn about a right lower axis that extends in the front-and-rear direction of the body frame, supports a lower portion of the left side member at a left end thereof so as to allow the lower portion to turn about a left lower axis that is parallel to the right upper axis, and which is supported on the body at a middle portion thereof so as to turn about a middle lower axis that is parallel to the right upper axis; and the front shaft on which the steering lock is provided is longer than a distance between the middle upper axis and the middle lower axis.

13. The vehicle according to claim 12, wherein the front shaft on which the steering lock is provided is thicker than an upper end of the right side member or an upper end of the left side member.

14. The vehicle according to claim 12, wherein the front shaft on which the steering lock is provided is longer than the right side member or the left side member.

15. The vehicle according to claim 1, wherein the cross member includes an upper cross member and a lower cross member that is provided below the upper cross member;

the body frame includes an upper support that supports the upper cross member so as to turn and a lower support that supports the lower cross member so as to turn; and the front shaft penetrates the body frame so that the front shaft passes the upper support and the lower support when seen from the front of the vehicle.

16. The vehicle according to claim 1, wherein the body frame includes a link support that supports the cross member so as to turn;

the cross member includes a front cross element that is disposed ahead of the link support and a rear cross element that is disposed behind the link support; and the front axis of the front shaft is disposed between a front end of the front cross element and a rear end of the rear cross element.

17. The vehicle according to claim 1, wherein the body frame includes a pipe-shaped link support that supports the cross member so as to turn;

the front shaft is provided coaxially with the pipe-shaped link support; and at least a portion of the front shaft is inserted into an interior of the pipe-shaped link support.

* * * * *